United States Patent
Tanaka et al.

(10) Patent No.: US 8,820,938 B2
(45) Date of Patent: Sep. 2, 2014

(54) PROJECTOR LIGHT SOURCE HAVING AN AIRFLOW COLLISION POSITION ABOVE A LIGHT EMISSION PORTION

(75) Inventors: Kazuhiro Tanaka, Azumino (JP); Hiroshi Yamanoi, Shiojiri (JP); Michiko Yamasaki, Kai (JP); Hiroshi Onodera, Matsumoto (JP); Yuichiro Iwama, Shiojiri (JP); Toshizo Nishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 379 days.

(21) Appl. No.: 13/069,993

(22) Filed: Mar. 23, 2011

(65) Prior Publication Data

US 2011/0234987 A1   Sep. 29, 2011

(30) Foreign Application Priority Data

Mar. 24, 2010  (JP) ................................ 2010-068244
Aug. 25, 2010  (JP) ................................ 2010-188623

(51) Int. Cl.
*G03B 21/16* (2006.01)
*F21V 29/02* (2006.01)
*F21V 29/00* (2006.01)
*G03B 21/20* (2006.01)

(52) U.S. Cl.
CPC ............. *F21V 29/02* (2013.01); *G03B 21/16* (2013.01); *F21V 29/027* (2013.01); *G03B 21/2006* (2013.01); *F21V 29/20* (2013.01); *G03B 21/2093* (2013.01)
USPC .................. 353/61; 353/57; 353/98; 362/294

(58) Field of Classification Search
CPC ...... G03B 21/00; G03B 21/006; G03B 21/16; G03B 21/20; G03B 21/2006; G03B 21/2026; G03B 21/2093; F21V 29/02; F21V 29/025; F21V 29/027; F21V 29/20; H01J 61/52
USPC ........... 353/52, 54, 57–58, 60–61, 94, 98–99, 353/119; 362/218, 264, 294; 313/46
See application file for complete search history.

(56) References Cited

U.S. PATENT DOCUMENTS 5,860,719 A * 1/1999 Suzuki et al. .................... 353/61
6,527,417 B2 * 3/2003 Basey ............................ 362/264
6,575,599 B1   6/2003 Imamura et al.
7,188,973 B2 * 3/2007 Katsuma ....................... 362/293

(Continued)

FOREIGN PATENT DOCUMENTS

CN           1790155 A      6/2006
JP      A-2002-189247       7/2002

(Continued)

*Primary Examiner* — Tony Ko
*Assistant Examiner* — Jori S Reilly-Diakun
(74) *Attorney, Agent, or Firm* — Oliff PLC

(57) ABSTRACT

A light source device includes: an arc tube having a light emission portion containing a pair of electrodes and configured to emit light by discharges induced between the pair of the electrodes; and a container body that accommodates the arc tube, the container body has a space in which the arc tube is accommodated, and a plurality of openings through that cooling fluids introduced from the outside of the container body are supplied into the space, the plural openings are formed at positions that allow the cooling fluids passing through the openings to collide with each other at a collision position above the light emission portion.

21 Claims, 20 Drawing Sheets

(56) References Cited

U.S. PATENT DOCUMENTS

| | | | |
|---|---|---|---|
| 7,210,825 B2* | 5/2007 | Watanabe et al. | 362/373 |
| 7,364,312 B2* | 4/2008 | Akiyama | 353/99 |
| 7,439,660 B2* | 10/2008 | Pollmann-Retsch et al. | 313/35 |
| 8,011,788 B2* | 9/2011 | Chang | 353/52 |
| 8,287,135 B2* | 10/2012 | Takezawa | 353/61 |
| 2004/0257813 A1 | 12/2004 | Takezawa | |
| 2008/0218050 A1* | 9/2008 | Soma et al. | 313/35 |
| 2008/0231812 A1* | 9/2008 | Sakai et al. | 353/58 |
| 2009/0153073 A1* | 6/2009 | Yamauchi et al. | 315/291 |
| 2010/0026966 A1 | 2/2010 | Nakano | |
| 2010/0103382 A1 | 4/2010 | Onodera et al. | |
| 2010/0201955 A1 | 8/2010 | Jougo | |
| 2010/0208151 A1 | 8/2010 | Utsunomiya | |
| 2011/0216285 A1 | 9/2011 | Saito et al. | |
| 2012/0075864 A1* | 3/2012 | Nishi et al. | 362/294 |
| 2013/0010267 A1* | 1/2013 | Tanaka | 353/52 |

FOREIGN PATENT DOCUMENTS

| | | |
|---|---|---|
| JP | A-2007-157385 | 6/2007 |
| JP | A-2009-86181 | 4/2009 |
| JP | A-2009-129622 | 6/2009 |
| JP | A-2010-38976 | 2/2010 |
| JP | A-2010-107574 | 5/2010 |
| TW | 424256 B | 3/2001 |

* cited by examiner

PROJECTOR LIGHT SOURCE HAVING AN AIRFLOW COLLISION POSITION ABOVE A LIGHT EMISSION PORTION

CROSS-REFERENCE

The entire disclosure of Japanese Patent Application No. 2010-068244 filed Mar. 24, 2010 and No. 2010-188623 filed Aug. 25, 2010 are expressly incorporated by reference herein.

BACKGROUND

1. Technical Field

The present invention relates to a light source device and a projector.

2. Related Art

A projector which includes a light source device, a light modulation device for forming image light corresponding to image information by modulating light emitted from the light source device, and a projection device for projecting the image light after expansion onto a projection surface such as a screen is known. The light source device of the projector contains a discharge-type arc tube such as an extra-high pressure mercury lamp in many cases. According to this type of arc tube, the temperature of the arc tube increases during light emission.

More specifically, the arc tube has a substantially spherical light emission portion into which a pair of electrodes and light emission substances such as mercury are sealed. During lighting of the arc tube thus constructed, the upper part of the light emission portion has the highest temperature, and the lower part of the light emission portion has the lowest temperature. When the high-temperature condition of the upper part of the light emission portion continues, the transparency of the arc tube easily decreases. Moreover, when the temperature difference between the upper part and the lower part increases, blackening easily occurs and often leads to deterioration of the arc tube.

For overcoming these problems, such a structure which directly supplies cooling air to the upper part of the light emission portion has been proposed (for example, see JP-A-2002-189247).

A lamp unit disclosed in JP-A-2002-189247 includes a discharge lamp containing a reflector and a power source bulb (arc tube), and a lamp holder to which the discharge lamp is attached. The lamp holder has a bottom support portion having an air inlet port, and an air direction changing plate is supported by the bottom support portion in such a condition as to be freely rotatable.

According to a projector disclosed in JP-A-2002-189247, the direction of cooling air is regulated by the air direction changing plate. The cooling air thus regulated is supplied via the air inlet port to a portion of the power source bulb above the bulb center as the portion where the temperature becomes high so as to cool the corresponding portion.

According to the projector shown in JP-A-2002-189247, cooling air can be supplied to the upper part of the light emission portion by rotation of the air direction changing plate either in a normal position where the projector is placed on an installation surface such as a desk, or in a suspended position where the projector is fixed to a ceiling or the like as the upside-down position of the normal position, for example.

According to the lamp unit disclosed in JP-A-2002-189247, however, cooling air is directly supplied to the high-temperature part close to the bulb center. In this case, the cooling efficiency lowers.

For promoting heat transmission at an improved heat transfer rate during cooling of the cooling target, there is a method which reduces the thickness of the temperature boundary layer of the cooling target to a thin film layer to promote heat transmission from the cooling target to cooling fluid, for example. According to this method, the flow speed of the cooling fluid is raised to a higher speed to lower the temperature of the cooling target based on the fact that the thickness of the temperature boundary layer is inversely proportional to the square root of the flow speed of the cooling fluid in the direction along the cooling target. For increasing the flow speed of the cooling fluid, the size of a fan supplying cooling air or the rotation speed of the fan needs to be increased when the cooling fluid is constituted by cooling air.

However, in case of the enlarged fan size, reduction of the size of the projector is difficult to be achieved. On the other hand, in case of the raised fan rotation speed, noise such as driving noise and wind noise produced by the fan increases. Accordingly, other structure which can improve the cooling efficiency for the arc tube has been demanded.

SUMMARY

An advantage of some aspects of the invention is to provide a light source device and a projector capable of improving the cooling efficiency for an arc tube.

A light source device according to an aspect of the invention includes: an arc tube having a light emission portion containing a pair of electrodes and configured to emit light by discharges induced between the pair of the electrodes; and a container body that accommodates the arc tube. The container body has a space in which the arc tube is accommodated, and a plurality of openings through that cooling fluids introduced from the outside of the container body are supplied into the space. The plural openings are formed at positions that allow the cooling fluids passing through the openings to collide with each other at a collision position above the light emission portion.

The arc tube is constituted by a discharge light emission type light source lamp such as an extra-high pressure mercury lamp, for example.

According to this structure, the cooling fluids having passed through the plural openings collide with each other at the collision position above the light emission portion. As a result, collision jet flow containing turbulent flow and turning flow and discretely diffused from the collision position is generated within the space in which the arc tube is accommodated. This collision jet flow supplied to the light emission portion can improve heat transmission between the light emission portion and the cooling fluids better than in a structure which supplies cooling fluid along the light emission portion. Accordingly, increase in the cooling efficiency for the arc tube, and thus prolongation of the life of the arc tube can be achieved.

Moreover, the collision jet flow can be securely supplied to the upper part of the light emission portion (top part of the light emission portion) where the temperature easily increases during lighting of the arc tube. In this case, the cooling efficiency for the light emission portion and further the cooling efficiency for the arc tube increase, and the temperature difference between the upper part and lower part of the light emission portion decreases. Thus, deterioration of the arc tube can be prevented.

It is preferable that the plural openings allow the cooling fluids to pass substantially at the same flow speed in the above aspect of the invention.

According to this structure, the plural openings allow the cooling fluids to pass substantially at the same flow speed. Thus, the collision position where the cooling fluids collide with each other can be easily controlled. Moreover, non-uniformity is not produced in the flow speed distribution of the collision jet flow generated at the collision position, which allows the collision jet flow to be securely supplied to the light emission portion. Accordingly, the cooling effect for the arc tube can further improve.

It is preferable that the light source device of the above aspect of the invention further includes a first reflection member that covers an area of one side of the pair of the electrodes in the light emission portion with a predetermined gap between the first reflection member and the light emission portion, the first reflection member reflects the received light from the light emission portion toward the other electrode side.

Light generated between the pair of the electrodes is radially emitted substantially from the center between the electrodes. Thus, when this light is used for illumination of a predetermined illumination area, such light released to the side opposite to the illumination area and not reaching the illumination area is produced. In this case, the efficiency of using light lowers.

According to the structure of this aspect of the invention, however, the light source device can reflect light emitted from the light emission portion toward the one electrode can be reflected toward the other electrode by using the first reflection member included in the light source device. Thus, the light emitted from the light source device can be easily supplied toward the illumination area, which improves the efficiency of using light.

When cooling fluid is directly supplied to the upper part of the light emission portion in the structure in which the first reflection member covers the light emission portion with the predetermined gap between the first reflection member and the light emission portion, the cooling fluid is blocked by the first reflection member. In this case, the area of the light emission portion covered by the first reflection member is not adequately cooled.

According to the structure of this aspect of the invention, however, the collision jet flow generated at the collision position above the light emission portion and containing turbulent flow and turning flow flows into the gap between the light emission portion and the first reflection member. Thus, the area of the light emission portion covered by the first reflection member can be cooled. Accordingly, the efficiency of using light emitted from the light emission portion, and further the cooling efficiency for the entire area of the arc tube both improve.

It is preferable that the light source device of the above aspect of the invention further includes a second reflection member attached to the sealing portion extending from at least one of ends of the light emission portion, the second reflection member has a substantially concavely curved reflection surface for reflecting light received from the light emission portion.

In this case, it is preferable that the second reflection member is disposed on the side opposite to the first reflection member with the light emission portion interposed therebetween when the first reflection member is provided.

According to this structure, the light source device has the second reflection member attached to the sealing portion of the arc tube. Thus, the efficiency of using light increases similarly to the structure which includes the first reflection member.

When the light source device has both the first reflection member and the second reflection member disposed on the side opposite to the first reflection member with the light emission portion interposed between the first and second reflection members, light emitted from the light emission portion toward the one electrode can be reflected toward the second reflection member by using the first reflection member. In addition, the second reflection member having the concavely curved reflection surface can reflect both the light emitted toward the other electrode and the light received from the first reflection member such that those lights can travel in one direction. Thus, almost all the light emitted from the light emission portion can be reflected in one direction by using the second reflection member, which further improves the efficiency of using light when the light is used for illumination of the illumination area.

Moreover, when the collision position is determined in the vicinity of the substantially concavely curved reflection surface, the cooling fluids supplied from the respective openings can flow along the reflection surface. In this case, the cooling fluids supplied from the openings can securely collide with each other at the collision position by the guide of the reflection surface. Accordingly, the collision position, that is, the generation position of the collision jet flow can be further easily controlled.

When the collision position is provided above the light emission portion at a position shifted toward the vicinity of the second reflection member from the center of the light emission portion, the collision jet flow generated at the collision position is bent by the second reflection member and flows toward the light emission portion. In this case, the flow amount of cooling fluid supplied to the light emission portion increases. Accordingly, the cooling efficiency for the light emission portion, and further the cooling efficiency for the arc tube can further improve.

It is preferable that the plural openings are positioned above the arc tube in the above aspect of the invention.

According to this structure, the respective openings are positioned above the arc tube. In this case, the channels of the cooling fluids between the respective openings and the collision position determined above the light emission portion become shorter than the corresponding channels in a structure in which the respective openings are positioned below the arc tube. Thus, the cooling fluids can collide with each other without greatly decreasing the flow speed of the cooling fluids flowing from the respective openings, and generate collision jet flow having a high flow speed. Accordingly, high flow speed collision jet flow can be supplied to the light emission portion, which further improves the cooling efficiency for the arc tube.

It is preferable that the plural openings are positioned below the arc tube in the above aspect of the invention.

According to this structure, the respective openings are positioned below the arc tube. In this case, the channels of the cooling fluids between the respective openings and the collision position become longer. Thus, the fluids within the space are stirred during supply of the cooling fluids, which improves the cooling effect for the entire area of the arc tube.

It is preferable that the plural openings are positioned substantially symmetric with the arc tube interposed between the openings, and the openings allow the cooling fluids to pass in directions inclined to the plane perpendicular to the optical axis of light emitted from the light source device substantially at the same angle in the above aspect of the invention.

According to this structure, the respective openings from which the cooling fluids are supplied are disposed substantially symmetric with the arc tube interposed therebetween. In this arrangement, the lengths from the respective openings to the collision position (distances) provided above the light emission portion become substantially equal. In this case, the flow speed distribution of the collision jet flow does not shift toward one of the openings. Moreover, since the cooling fluids flowing toward the collision position are supplied from the respective openings with inclination of substantially the same angle, the shift of the flow speed distribution of the collision jet flow can be further prevented. Thus, the collision jet flow can be securely supplied toward the light emission portion, which further increases the cooling efficiency for the arc tube.

It is preferable that the plural openings are slit-shaped in the above aspect of the invention.

According to this structure, the filmy (zonal) cooling fluids are supplied from the respective openings. In this structure, the flows of the cooling fluids supplied from the openings can be stabilized, which allows easy control over the flow directions of the cooling fluids. Moreover, since the cooling fluids are narrowed during supply by the slit-shaped openings, the pressure drop of the cooling fluids before reaching the collision position is prevented, which contributes to secure generation of the collision jet flow mentioned above.

It is preferable that the light source device of the above aspect further includes a duct configured to guide a cooling fluid from the outside of the light source device toward the plural openings. The duct has a tabular member disposed in the end side of the duct. The tabular member has a plurality of holes through that the cooling fluid passes.

According to this structure, the pressure of the cooling fluid within the plane perpendicular to the flow direction of the cooling fluid can be equalized while the cooling fluid having traveled through the inside of the duct is passing through the holes of the tabular member. In this case, the cooling fluid can be divided into equal parts of the respective openings, and thus the cooling fluids having the same flow amount can be supplied through the respective openings. Accordingly, the shift of the collision jet flow mentioned above can be further prevented.

Alternatively, the light source device of the above aspect of the invention further includes a duct configured to guide a cooling fluid from the outside of the light source device toward the plural openings. The duct has a passage port having a smaller cross-sectional area than the average cross-sectional area of the duct in the end side of the duct as a port through which the cooling fluid passes.

According to this structure, the passage port having a smaller cross-sectional area than the average cross-sectional area of the duct is provided in the course of the cooling fluid after passing through the inside of the duct and before reaching the openings. In this arrangement, the pressure of the cooling fluid within the plane perpendicular to the flow direction of the cooling fluid can be equalized while the cooling fluid is passing through the passage port. In this case, the cooling fluid can be divided into equal parts supplied into the respective openings similarly to the structure described above, and thus the cooling fluids having the same flow amount can be supplied through the respective openings. Accordingly, the shift of the collision jet flow mentioned above can be further prevented.

A projector according to another aspect of the invention includes: the light source device described above; a light modulation device configured to modulate light emitted from the light source device; and a projection device configured to project the modulated light.

According to this aspect of the invention, advantages similar to those of the light source device descried above can be offered. In addition, increase in the life of the arc tube contributes to prolongation of cycles for replacing the light source device with new one, and thus reduces labor required for maintenance of the projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

Figure 1:
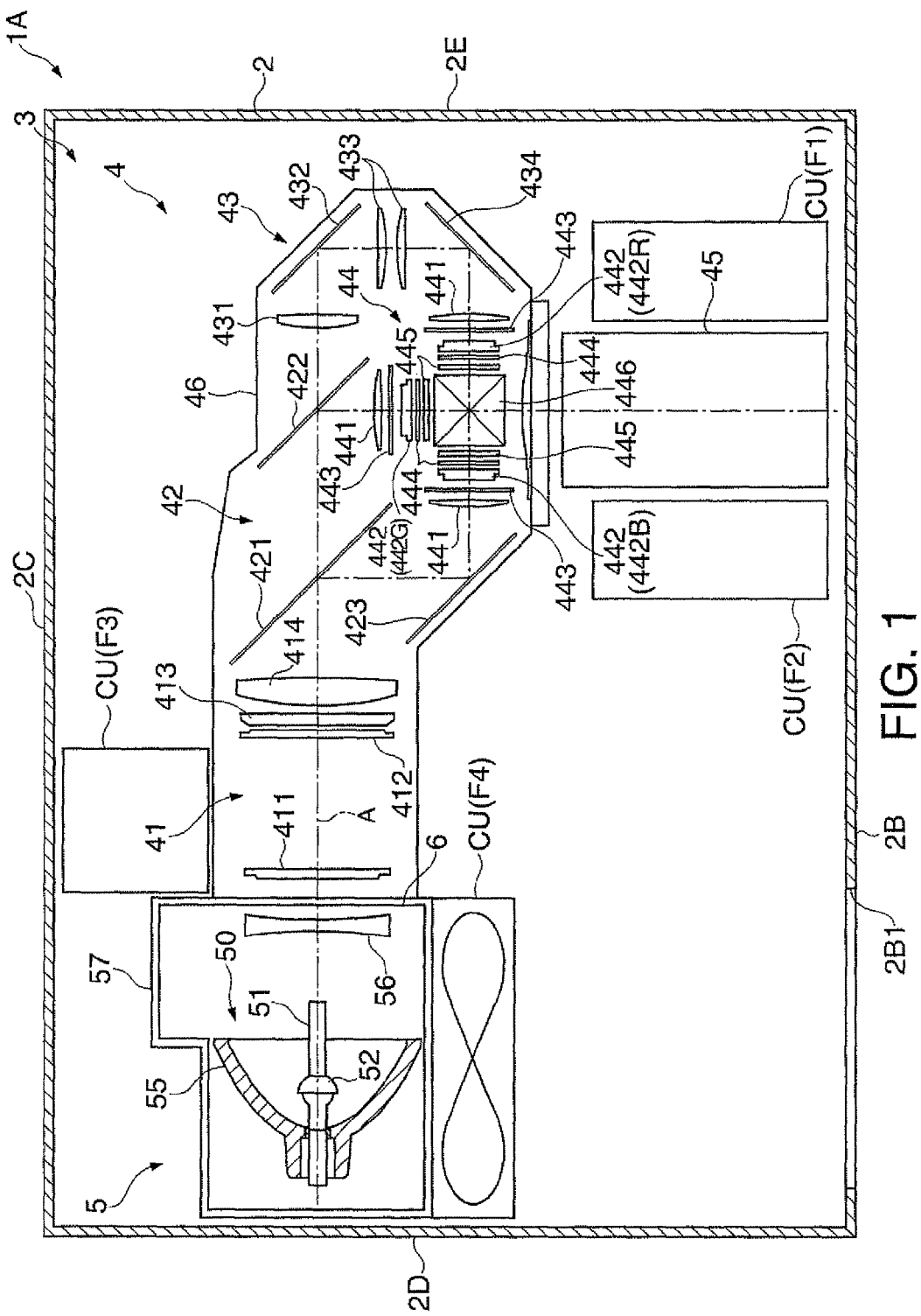
FIG. 1 schematically illustrates the structure of a projector according to a first embodiment of the invention.

FIG. 1 schematically illustrates the structure of a projector 1A according to this embodiment.

The projector 1A in this embodiment forms image light corresponding to image information by modulating light emitted from a light source provided within the projector 1A, and projects the image light after expansion onto a projection surface such as a screen. As illustrated in FIG. 1, the projector 1A includes an external housing 2 constituting the external case, and an apparatus main body 3 accommodated and positioned within the external housing 2.

The external housing 2 is a substantially rectangular member in the plan view which has a top surface (not shown), a front surface 2B, a rear surface 2C, a left side surface 2D, a right side surface 2E, and a bottom surface (not shown). The bottom surface has a plurality of feet (not shown). The projector 1A is in a normal position when these feet are placed in contact with an installation surface, and in a suspended position when the projector 1A is attached with the bottom surface facing to a ceiling or the like in the upside-down condition of the normal position.

The apparatus main body 3 includes an optical unit 4 and a cooling device CU. The apparatus main body 3 further includes a power source device for supplying power to the respective components of the projector 1A, a control device for controlling the operations of the respective components of the projector 1A, and others, as units not shown in the figures.

The cooling device CU has a plurality of fans F1 through F4, and introduces cooling air as cooling fluid from the outside of the external housing 2 to supply the cooling air to the power source device and the control device and cool these devices. A pair of the fans F1 and F2 between which a projection device 45 described later is sandwiched are constituted by sirocco fans, and introduce cooling air from the outside through an air intake port (not shown) formed on the external housing 2 to supply the cooling air to an electro-optic device 44 described later.

The fan F3 as one of the pair of the fans F3 and F4 disposed in the vicinity of a light source device 5 described later is located near the rear surface 2C of the projector LA and constituted by a sirocco fan to suck cooling air within the external housing 2 and supply the cooling air to the light source device 5.

The fan F4 is constituted by an axial fan which sucks the air having cooled the light source device 5 and discharges the air toward the front surface 2B of the projector 1A and further to the outside of the external housing 2 via an air outlet port 2B1 formed on the front surface 2B. The fan F3 may be an axial fan, and/or the fan F4 may be a sirocco fan. The air outlet port 2B1 may be formed on any surface of the external housing 2.

Structure of Optical Unit

The optical unit 4 forms image light corresponding to image information and projects the image light under the control of the control device. The optical unit 4 includes the light source device 5, an illumination device 41, a color separation device 42, a relay device 43, the electro-optic device 44, the projection device 45, and an optical component housing 46 which accommodates and disposes the respective devices 5, 41 through 44 at predetermined positions on an illumination optical axis A established within the optical component housing 46, and supports the projection device 45.

The light source device 5 emits light. The structure of the light source device 5 will be described in detail later.

The illumination device 41 has a pair of lens arrays 411 and 412, a polarization converting element 413, and a stacking lens 414.

The color separation device 42 has dichroic mirrors 421 and 422 and a reflection mirror 423. The relay device 43 has an entrance side lens 431, a relay lens 433, and reflection mirrors 432 and 434.

The electro-optic device 44 has a field lens 441, three liquid crystal panels 442 as light modulation devices (red liquid crystal panel 442R, green liquid crystal panel 442G, and blue liquid crystal panel 442B), three entrance side polarization plates 443, three visibility angle compensation plates 444, three exit side polarization plates 445, and a cross dichroic prism 446 as a color combining device.

The projection device 45 expands the light modulated by the electro-optic device 44 and projects the expanded light. The projection device 45 has a combination of plural lenses accommodated in a cylindrical lens barrel (not shown).

According to the optical unit 4 having this structure, the illuminance of light emitted from the light source device 5 is made substantially uniform within an illumination area. Then, the resultant light is separated into three color lights in red (R), green (G), and blue (B) by the function of the color separation device 42. The separated color lights are modulated by the corresponding liquid crustal panels 442 according to image information. The modulated color lights are combined by the cross dichroic prism 446, and expanded and projected onto the projection surface through the projection device 45.

Structure of Light Source Device

Figure 2:
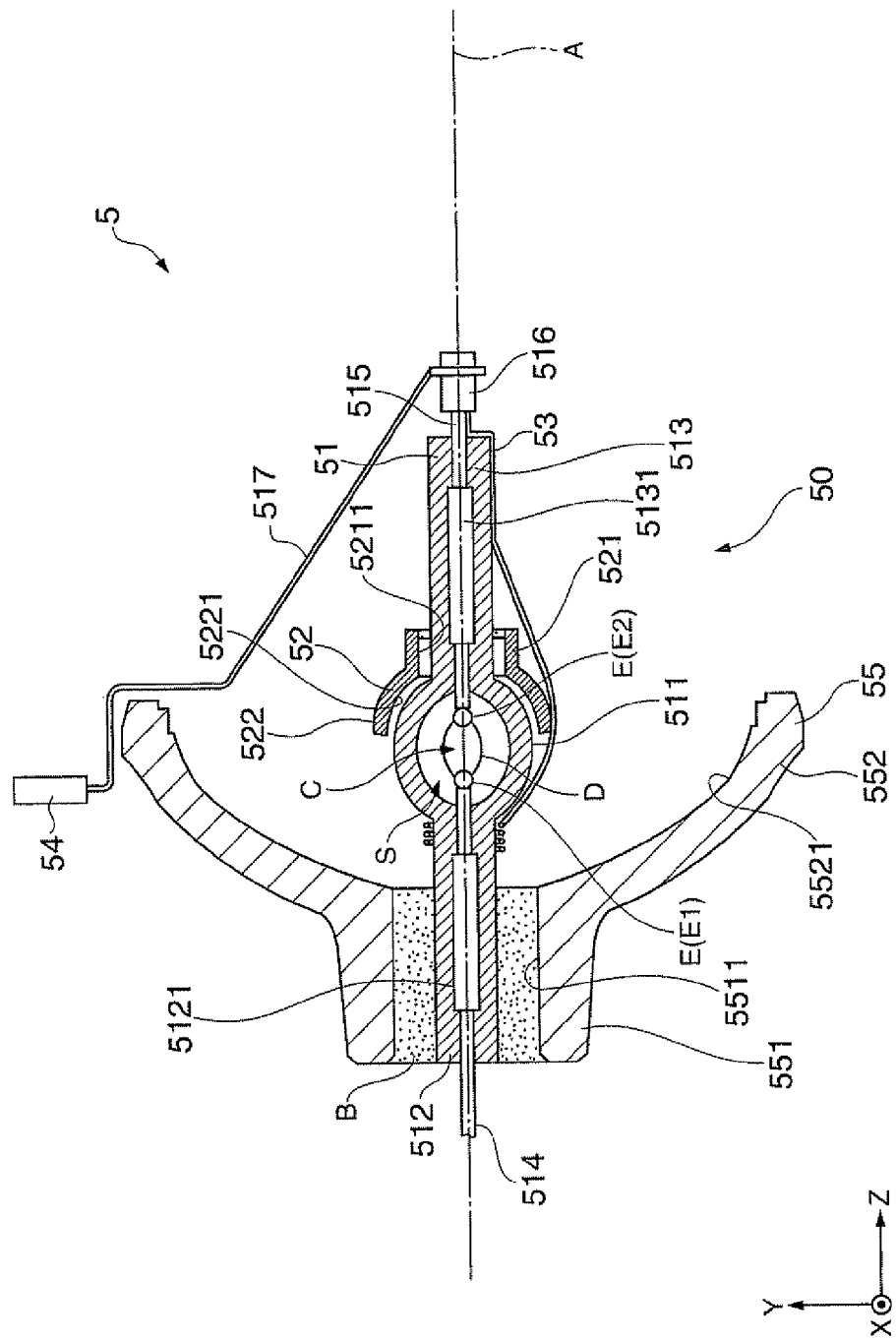
FIG. 2 is a vertical cross-sectional view of a light source lamp and a main reflection mirror according to the first embodiment.

FIG. 2 is a vertical cross-sectional view illustrating a light source lamp 50 and a main reflection mirror 55 of the light source device 5. In the following description and depiction, the traveling direction of light emitted from the light source device 5 in the horizontal direction in the normal position of the projector 1A is referred to as a Z direction. The direction crossing the Z direction at right angles and extending in the horizontal direction toward the left as viewed from the top end side in the Z direction is referred to as an X direction. The direction crossing the Z direction and the X direction at right angles and extending in the upward direction (direction opposite to the downward vertical direction) is referred to as a Y direction. Thus, the respective directions indicated by X, Y, and Z cross one another at right angles.

As illustrated in FIGS. 1 and 2, the light source device 5 has the light source lamp 50 for emitting light, the main reflection mirror 55, a collimating concave lens 56 (FIG. 1), and a housing 57 which accommodates and positions these components (FIG. 1).

The collimating concave lens 56 collimates light converged by the main reflection mirror 55 such that the light travels in parallel with the illumination optical axis A.

As illustrated in FIG. 2, the light source lamp 50 has an arc tube 51 made of quartz glass, and a sub reflection mirror 52 and a trigger line 53 attached to the arc tube 51. The arc tube 51 may be selected from various types of discharge light source lamps capable of emitting high-luminance light such as a metal halide lamp, a high-pressure mercury lamp, and an extra-high pressure mercury lamp.

Structure of Arc Tube

The arc tube 51 is a light source which emits light when voltage is applied thereto, and has a light emission portion 511 expanded substantially in a spherical shape, and a pair of sealing portions 512 and 513 extending from both ends of the light emission portion 511 in directions away from each other (sealing portions on the root end side and on the top end side in the Z direction are referred to as the sealing portion 512 and the sealing portion 513, respectively).

A pair of electrodes E (electrodes on the root end side and on the top end side in the Z direction are referred to as an electrode E1 and an electrode E2, respectively) are contained in the light emission portion 511. A discharge space S into which light emission substances containing mercury, rare gas, and a small quantity of halogen are sealed is formed between the pair of the electrodes E.

Metal foils 5121 and 5131 made of molybdenum and electrically connected with the electrodes E1 and E2, respectively, are inserted into the corresponding sealing portions 512 and 513. The ends of the sealing portions 512 and 513 on the side opposite to the light emission portion 511 are sealed by glass or other materials. Leads 514 and 515 are connected with the metal foils 5121 and 5131, respectively, and extend to the outside of the arc tube 51. When voltage is applied to the leads 514 and 515, discharges are induced between the electrodes E1 and E2 by the potential difference produced therebetween via the metal foils 5121 and 5131. As a result, light is emitted from the inside of the light emission portion 511 with an arc image D formed therein.

Structure of Main Reflection Mirror

The main reflection mirror 55 is now explained.

The main reflection mirror 55 corresponds to a second reflection member in the appended claims, and is formed by a molded one-piece component made of glass as a mirror which reflects received light for convergence of the light on a second focus on the illumination optical axis A. The main reflection mirror 55 is fixed to the sealing portion 512 by an adhesive B such as cement. The main reflection mirror 55 thus constructed has a substantially cylindrical neck-shaped portion 551 extending along the sealing portion 512, and a reflection portion 552 having a concavely curved surface expanding from the neck-shaped portion 551.

A reflection surface 5521 on which a metal thin film is deposited is formed on the surface of the reflection portion 552 as the surface having a shape of a curved line of revolution and disposed to be opposed to the light emission portion 511.

The neck-shaped portion 551 has a substantially circular insertion hole 5511 into which the sealing portion 512 is inserted. The adhesive B is injected between the edge of the insertion hole 5511 and the sealing portion 512 under the condition in which the sealing portion 512 is inserted into the insertion hole 5511. As a result, the sealing portion 512 and the main reflection mirror 55 are fixed to each other. In this case, the positions of the arc tube 51 and the main reflection mirror 55 are determined such that a center position C of the arc image D formed by the discharges between the ends of the electrodes E is located in the vicinity of a first focus of the reflection surface 5521.

While the main reflection mirror 55 is constituted by an ellipsoidal reflector having a spheroidal surface in this embodiment, the main reflection mirror 55 may be a paraboloidal reflector having a surface of a paraboloid of revolution. When the main reflection mirror 55 is a paraboloidal reflector, the collimating concave lens 56 can be eliminated. Alternatively, the main reflection mirror 55 may be constituted by a reflector having a freely curved surface.

Structure of Sub Reflection Mirror

The sub reflection mirror 52 corresponds to a first reflection member in the appended claims, and is constituted by a molded component made of glass and attached to the sealing portion 513 in such a condition as to cover the light emission portion 511 on the sealing portion 513 side with a predetermined gap left between the sub reflection mirror 52 and the light emission portion 511. The sub reflection mirror 52 has a substantially cylindrical neck-shaped portion 521 extending along the sealing portion 513, and a reflection portion 522 expanded from the end of the neck-shaped portion 521 on the sealing portion 512 side.

The neck-shaped portion 521 has an opening 5211 through which the sealing portion 513 is inserted.

The reflection portion 522 has a substantially bowl shape extending along the light emission portion 511. A reflection surface 5221 as a substantially concavely curved surface which reflects visible light and transmits infrared light and ultraviolet light is formed on the reflection portion 522 on the side opposed to the light emission portion 511.

The light emitted from the light emission portion 511 and traveling toward the electrode E2 side (light emitted toward the top end in the Z direction) is reflected by the reflection surface 5221 and reaches the reflection surface 5521. Then, the light is reflected by the reflection surface 5521 and converged on the second focus similarly to the light directly supplied to the reflection surface 5521 from the light emission portion 511. Thus, generation of light not entering the lens array 411 disposed downstream in the optical path from the light source device 5 can be prevented.

Structure of Trigger Line

The trigger line 53 is a starting support line for improving lighting startability of the arc tube 51. One end of the trigger line 53 is wound around the sealing portion 512 in a coil shape. The center of the trigger line 53 is disposed along the outside of the light emission portion 511, the sub reflection mirror 52, and the sealing portion 513. The other end of the trigger line 53 is connected with the lead 515 via a connection portion 516. One end of a lead 517 extending to the outside of the main reflection mirror 55 is connected with the connection portion 516. The other end of the lead 517 is connected with a connector 64 (see FIG. 3) to which voltage is applied with a connection member 54 provided between the lead 517 and the connector 64. According to this structure, high voltage is applied to the trigger line 53 to improve the lighting startability of the arc tube 51.

Structure of Housing

Figure 3:
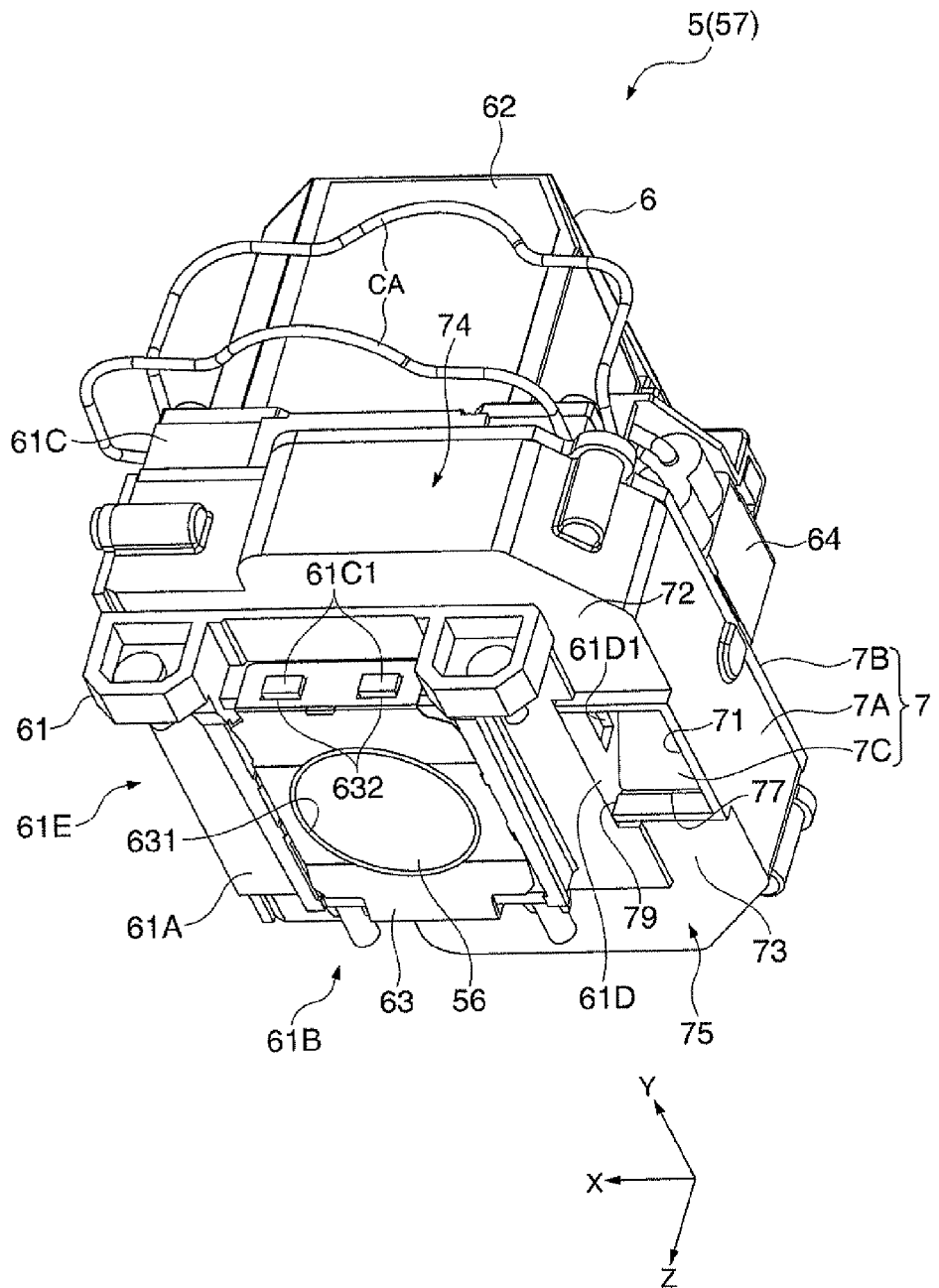
FIG. 3 is a perspective view of a light source device according to the first embodiment.

FIG. 3 is a perspective view illustrating the light source device 5.

The housing 57 corresponding to a container body in the appended claims accommodates the light source lamp 50 and the main reflection mirror 55 as described above, and supports the collimating concave lens 56. As illustrated in FIG. 3, the housing 57 has a container main body 6, and a duct 7 connected with an air outlet port of the fan F3.

Structure of Duct

Figure 4A:
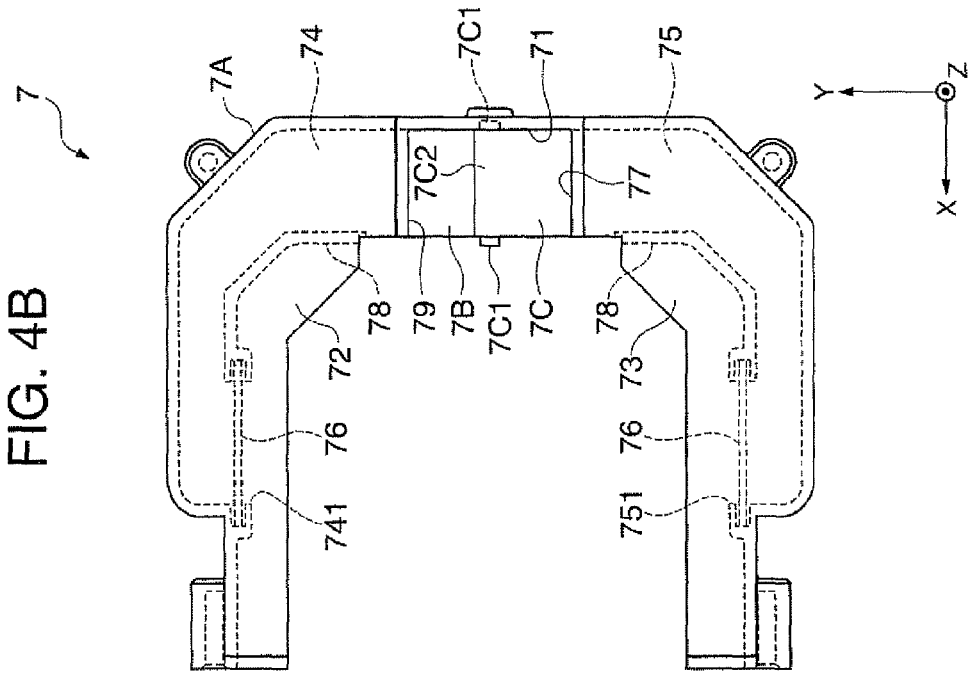
FIGS. 4A and 4B illustrate a duct according to the first embodiment.
Figure 4B:
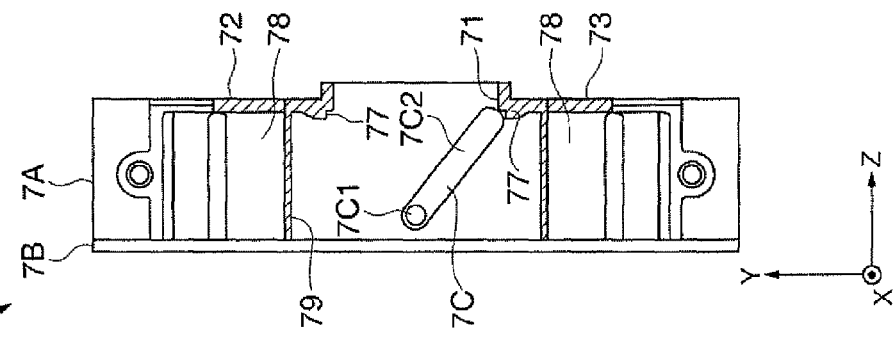

FIGS. 4A and 4B illustrate the duct 7. More specifically, FIG. 4A is a side view of the duct 7 as viewed from the top end side in the X direction, while FIG. 4B is a front view of the duct 7 as viewed from the top end side in the Z direction.

The duct 7 is attached to the container main body 6 (more specifically, a bottom surface 61B, a top surface 61C, and a side surface 61D of a first main body 61 described later) to introduce cooling air discharged from the fan F3 into the container main body 6. As illustrated in FIG. 4A, the duct 7 has a duct main body 7A positioned on the top end side in the Z direction, a plate body 7B positioned on the root end side in the Z direction, and an air guide plate 7C supported within the duct main body 7A in such a condition as to be freely rotatable. The duct main body 7A and the plate body 7B have substantially line-symmetric shapes with respect to a straight line passing through the center in the Y direction and extending along the X direction, and are fixed to each other by a screw or the like. In this arrangement, the duct 7 becomes a substantially U-shaped component as viewed from the top end in the Z direction as illustrated in FIG. 4B.

The duct 7 has a substantially rectangular opening 71 disposed on the top end side in the Z direction and connected with the air outlet port of the fan F3, and contact portions 72 and 73 formed on the top end side and the root end side in the Y direction, respectively, and brought into contact with a front surface 61A of the first main body 61 described later from the root end side in the Z direction. The duct 7 further has a first duct portion 74 and a second duct portion 75 each of which contains a space communicating with the outside of the duct 7 via the opening 71.

The first duct portion 74 extends toward the top end side in the Y direction and further toward the top end side in the X direction, and is then bent toward the root end side in the Y direction. An opening 741 opened to the root end side in the Y direction is formed at the end of the first duct portion 74 on the top end side in the X direction.

Similarly, the second duct portion 75 extends toward the root end side in the Y direction and further toward the top end side in the X direction, and is then bent toward the top end side in the Y direction. An opening 751 opened to the top end side in the Y direction is formed at the end of the second duct portion 75 on the top end side in the X direction.

Figure 5:
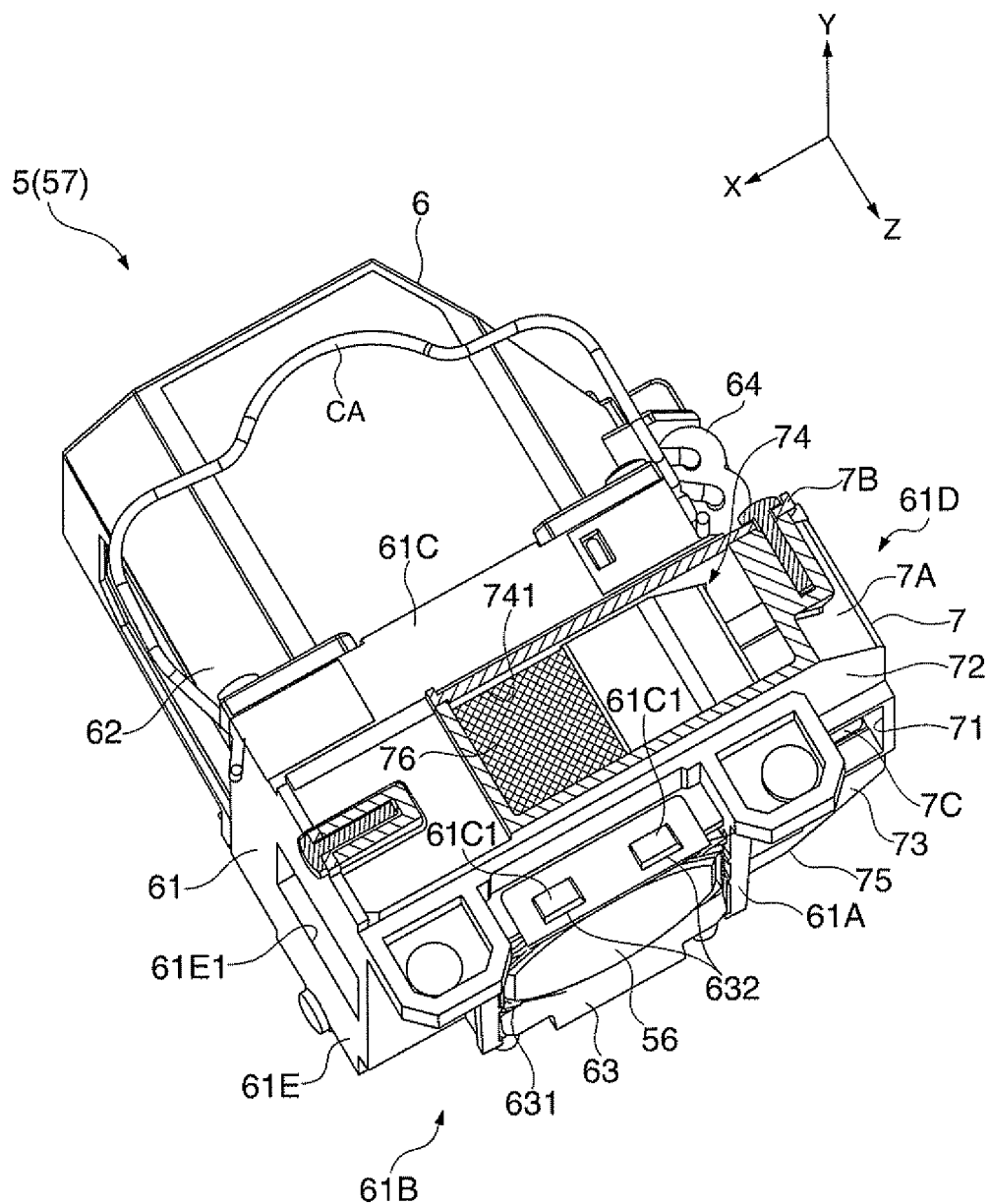
FIG. 5 is a perspective view illustrating the light source device from which the duct is cut and removed according to the first embodiment.

FIG. 5 is a perspective view illustrating the light source device 5 under the condition in which a part of the duct 7 attached to the container main body 6 is cut along the X direction.

As illustrated in FIGS. 4A and 4B and FIG. 5, a metallic mesh 76 is attached to each of the openings 741 and 751 (only the opening 741 is shown in FIG. 5) for covering the openings 741 and 751.

The metallic mesh 76 corresponds to a tabular member in the appended claims, and has a plurality of small holes. The respective metallic meshes 76 prevent scattering of broken pieces of the arc tube 51 to the outside of the housing 57 when the arc tube 51 accommodated within the first main body 61 described later is broken or for other reasons. The metallic meshes 76 have a function of equalizing the pressure of cooling air within the plane perpendicular to the flowing direction of the cooling air flowing within the first duct portion 74 and the second duct portion 75. Details of this function will be described later.

The air guide plate 7C is located on the traveling direction of cooling air introduced from the fan F3 to guide the cooling air toward either the first duct portion 74 or the second duct portion 75 corresponding to the duct portion positioned above. The air guide plate 7C has a pair of cylindrical portions 7C1 functioning as rotation shafts and a substantially rectangular air guide portion 7C2, forming a substantially T shape on the whole.

One of the cylindrical portions 7C1 engages with a hole (not shown) formed on the inside of the duct main body 7A, and the other cylindrical portion 7C1 engages with a hole (not shown) formed on the side surface 61D (described later) of the first main body 61. According to this structure, the air guide plate 7C supported in such a manner as to be freely rotatable rotates in the downward direction by gravity to be inclined to the Z direction and the Y direction. As a result, the end of the air guide portion 7C2 on the side opposite to the cylindrical portions 7C1 contacts a contact portion 77 formed in the vicinity of the opening 71. This contact regulates excessive rotation of the air guide plate 7C.

By rotation and inclination of the air guide plate 7C by gravity, the cooling air introduced through the opening 71 is guided toward the first or second duct portion 74 or 75 positioned above either in the normal position or in the suspended position of the projector 1A.

The cooling air introduced to the corresponding duct portion flows therethrough in the upward direction, and then travels toward the top end side in the X direction to be guided into the first main body 61 through the opening.

A side surface 78 of the duct 7 positioned at the bottom of the U shape contacts the side surface 61D described later when the duct 7 is attached to the container main body 6. In this condition, a part of the cooling air guided into the duct 7 through the opening 71 is introduced into the container main body 6 through an opening 79 formed on the side surface 78 and an opening 61D1 (see FIG. 3) formed on the side surface 61D of the first main body 61.

Structure of Container Main Body

As illustrated in FIG. 3, the container main body 6 has the first main body 61 covering the area of the main reflection mirror 55 on the top end side in the Z direction, a second main body 62 covering the area of the main reflection mirror 55 on the root end side in the Z direction, a cover member 63 attached to the first main body 61, and the connector 64.

Structure of Second Main Body

The second main body 62 is a component for protecting the lead 514 extending from the sealing portion 512 such that direct touch with the lead 514 by the user can be avoided. The second main body 62 has a box shape having a substantially U-shaped cross section on which an opening 621 (see FIG. 7) is formed on the top end side in the Z direction. The second main body 62 is combined with the first main body 61 in such a condition that the edge of an opening 611 (see FIG. 7) formed on the first main body 61 on the root end side in the Z direction contacts the edge of the opening 621 to form the box-shaped container main body 6.

The connector 64 connected with the lead 514 and the connection member 54 via a cable CA is attached to the outside surface of the second main body 62.

Structure of First Main Body

The first main body 61 supports the main reflection mirror 55 and the collimating concave lens 56, and forms a compartment space RS (see FIG. 7) in which the arc tube 51 is accommodated. As illustrated in FIG. 3, the first main body 61 has the front surface 61A positioned on the top end side in the Z direction, the bottom surface 61B and the top surface 61C positioned on the root end side and the top end side in the Y direction, respectively, and the side surface 61D and a side surface 61E positioned on the root end side and the top end side in the X direction, respectively. The first main body 61 has a box shape on which the opening 611 is formed on the root end side in the Z direction.

The front surface 61A has an opening 61A1 (see FIG. 7) through which light released from the arc tube 51 and the main reflection mirror 55 accommodated in the first main body 61 passes. The collimating concave lens 56 engages with the opening 61A1. The cover member 63 which presses the collimating concave lens 56 toward the front surface 61A to support the collimating concave lens 56 is attached to the front surface 61A.

The cover member 63 is a member made of metal and having a substantially C shape in the side view, and has a circular opening 631 substantially at the center. The opening 631 transmits light collimated by the collimating concave lens 56. The cover member 63 having this structure is attached to the front surface 61A by insertion of projections 61B1 and 61C1 formed on the bottom surface 61B and the top surface 61C into holes 632 formed on a pair of ends of the cover member 63 in the direction along the XZ plane.

Figure 6:
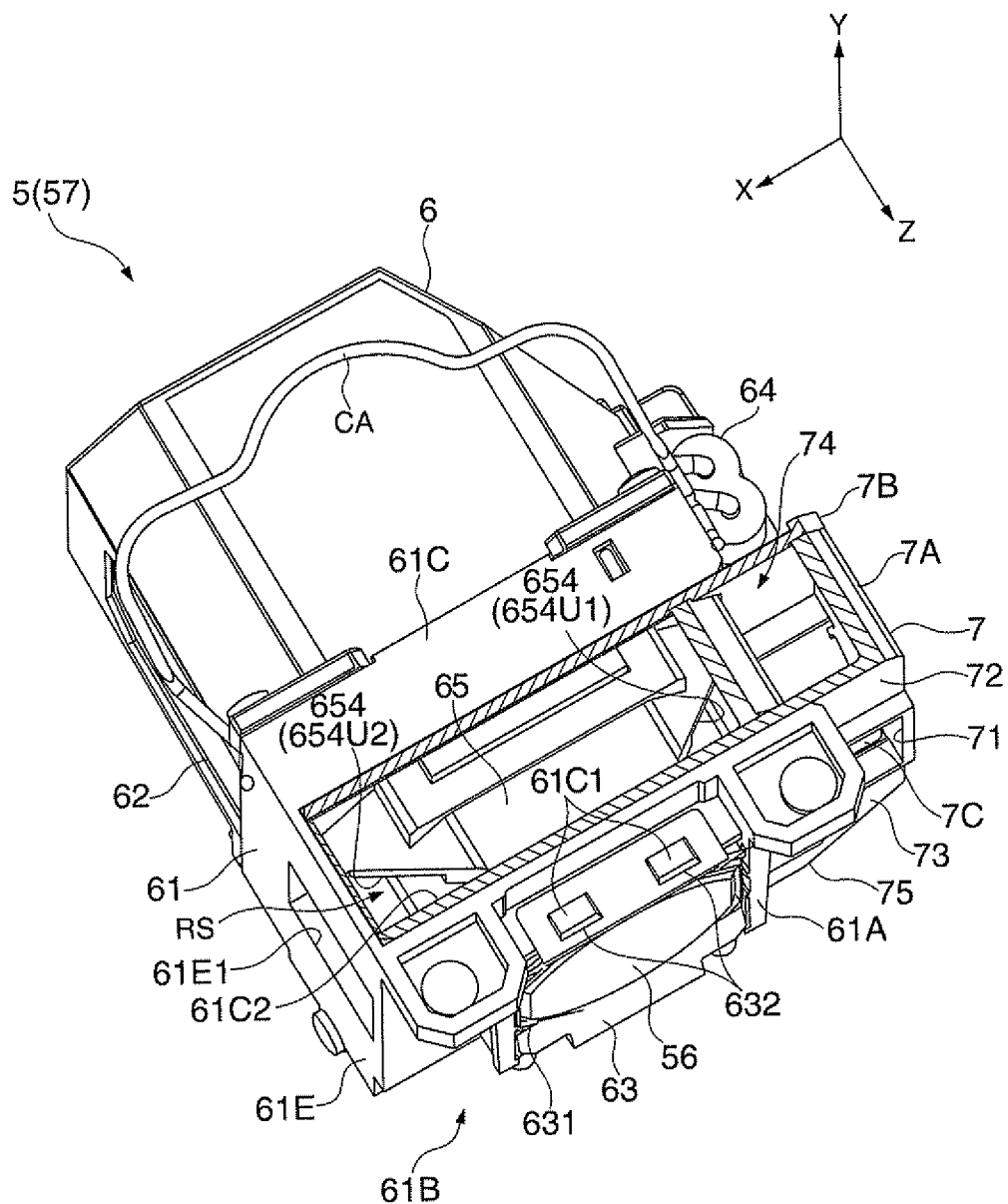
FIG. 6 is a perspective view illustrating the light source device from which the duct is cut and removed according to the first embodiment.

FIG. 6 is a perspective view illustrating the light source device 5 under the condition in which a part of the duct 7 attached to the container main body 6 is cut and removed.

As illustrated in FIG. 6, the top surface 61C has a substantially rectangular opening 61C2 extending in the X direction as well as the projections 61C1. The opening 61C2 is closed by the first duct portion 74 of the duct 7. Thus, the cooling air having passed through the inside of the first duct portion 74 is introduced into the first main body 61 through the opening 61C2.

Air supply ports 654 (654U1 and 654U2) provided on a light shield member 65 disposed within the first main body 61 are exposed through the opening 61C2. Thus, the cooling air introduced through the opening 61C2 is guided into the compartment space RS formed within the light shield member 65 via the two air supply ports 654U1 and 654U2.

Though not shown in FIG. 6, an opening 61B2 (see FIG. 7) similar to the opening 61C2 is formed on the bottom surface 61B, and is closed by the second duct portion 75. Air supply ports 654 (654D1 and 654D2) (see FIGS. 9 and 10) formed on the light shield member 65 are exposed through the opening 61B2. Thus, cooling air having passed through the inside of the second duct portion 75 is introduced into the compartment space RS (see FIG. 7) through the opening 61B2 and the two air supply ports 654D1 and 654D2.

As illustrated in FIG. 3, the side surface 61D has the substantially rectangular opening 61D1. As explained above, a part of the cooling air introduced into the duct 7 through the opening 71 flows into the opening 61D1, and then is guided into the compartment space RS via a pair of openings 652 formed on the light shield member 65 (see FIGS. 9 and 10) to cool the area of the arc tube 51 on the sealing portion 513 side.

The side surface 61E has an outlet port 61E1 which connects the compartment space RS and the outside of the housing 57 via an opening 653 (see FIGS. 9 and 10) formed on the light shield member 65. The air within the compartment space RS is sucked by the operation of the fan F4 and discharged via the outlet port 61E1 to the outside of the housing 57.

Internal Structure of First Main Body

Figure 7:
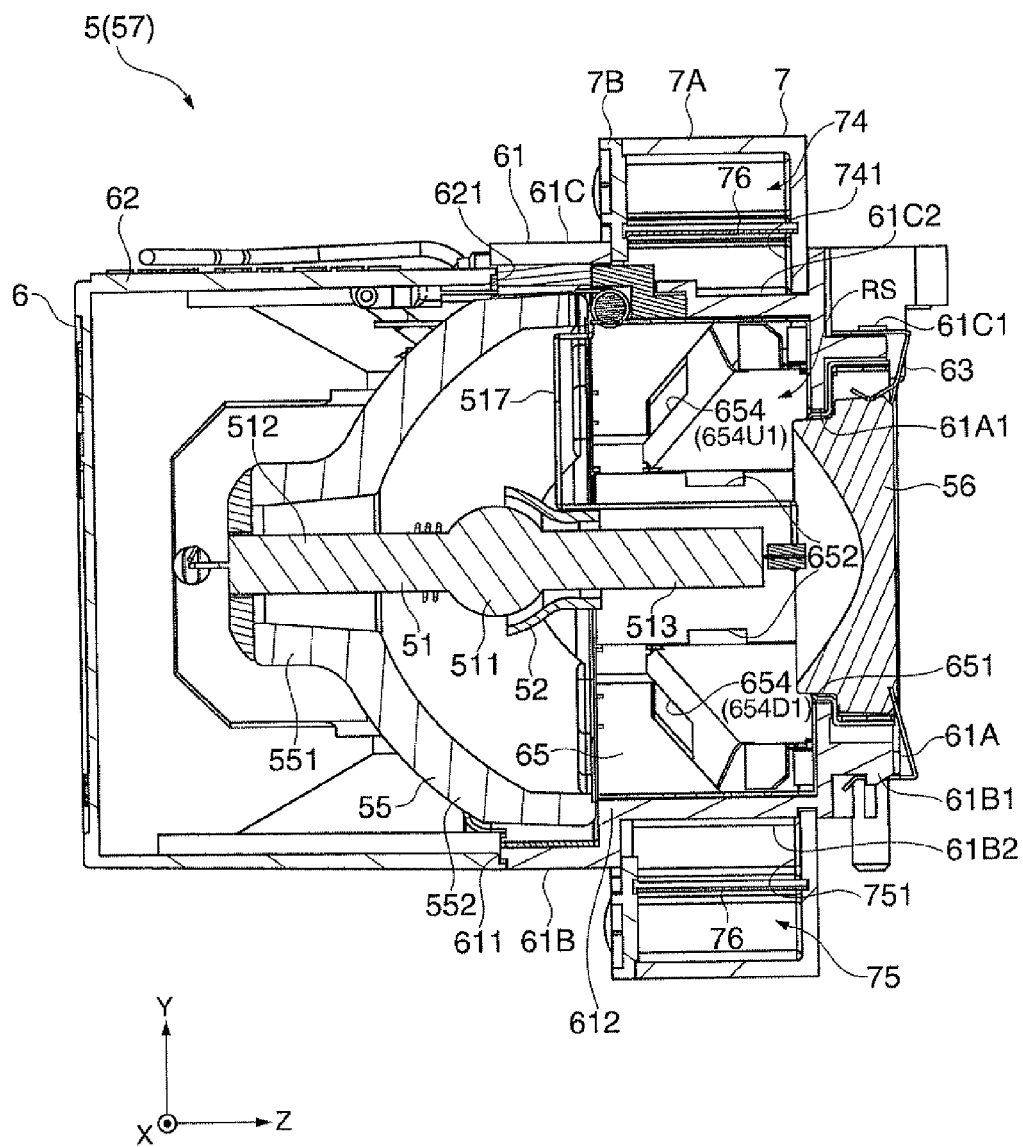
FIG. 7 is a vertical cross-sectional view of the light source device according to the first embodiment.
Figure 8:
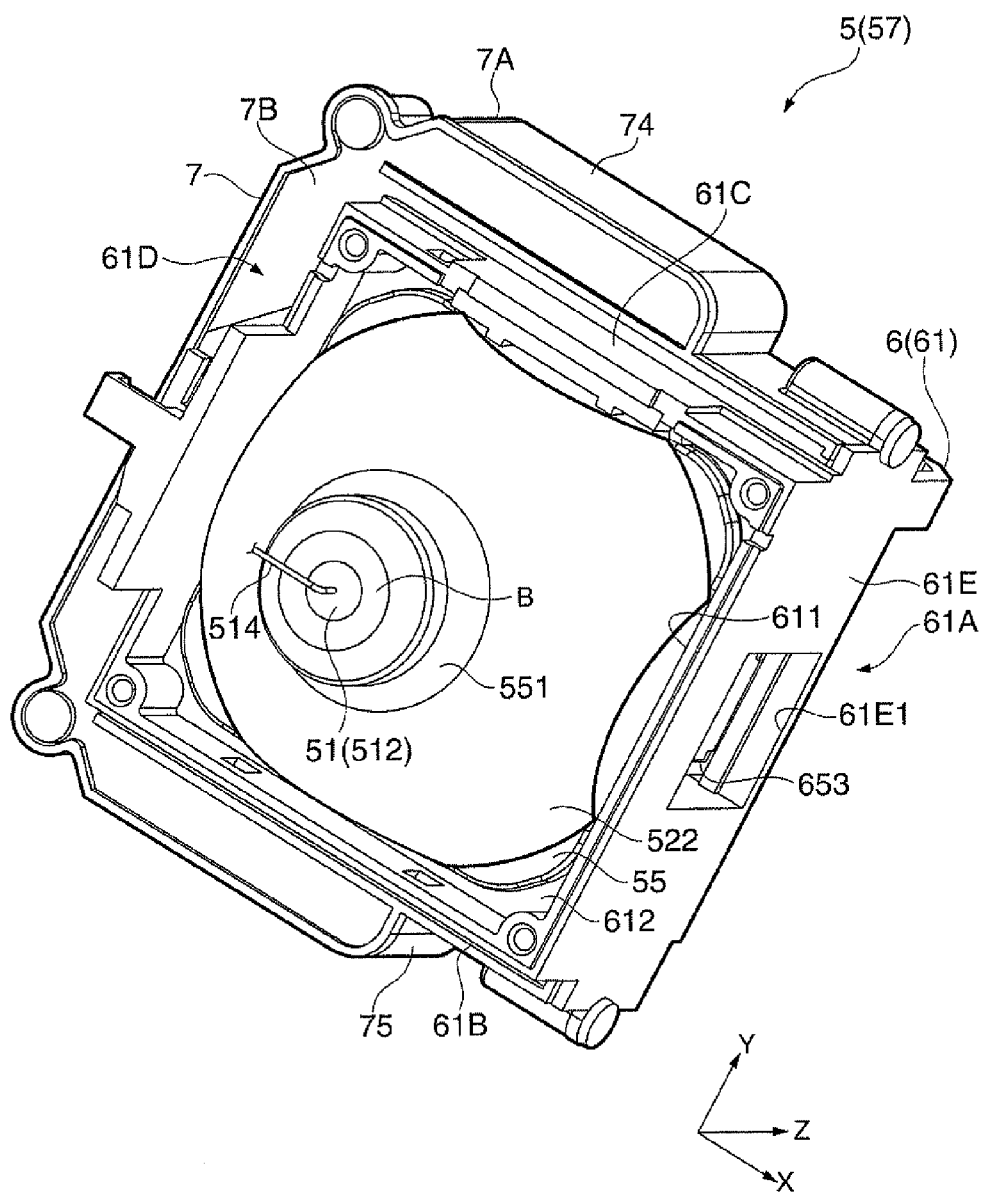
FIG. 8 is a perspective view of a first main body according to the first embodiment.
Figure 9:
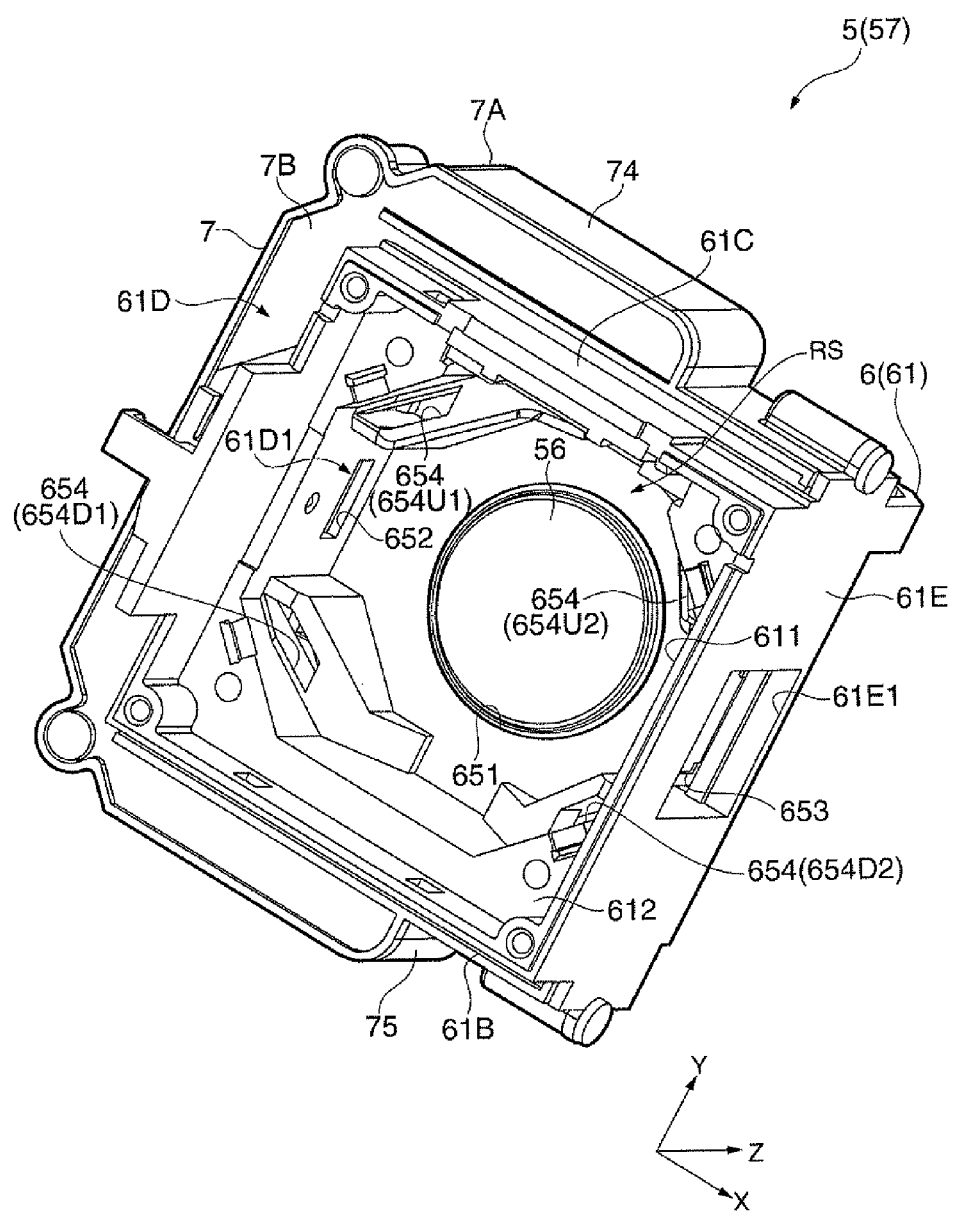
FIG. 9 is a perspective view of the first main body according to the first embodiment.
Figure 10:
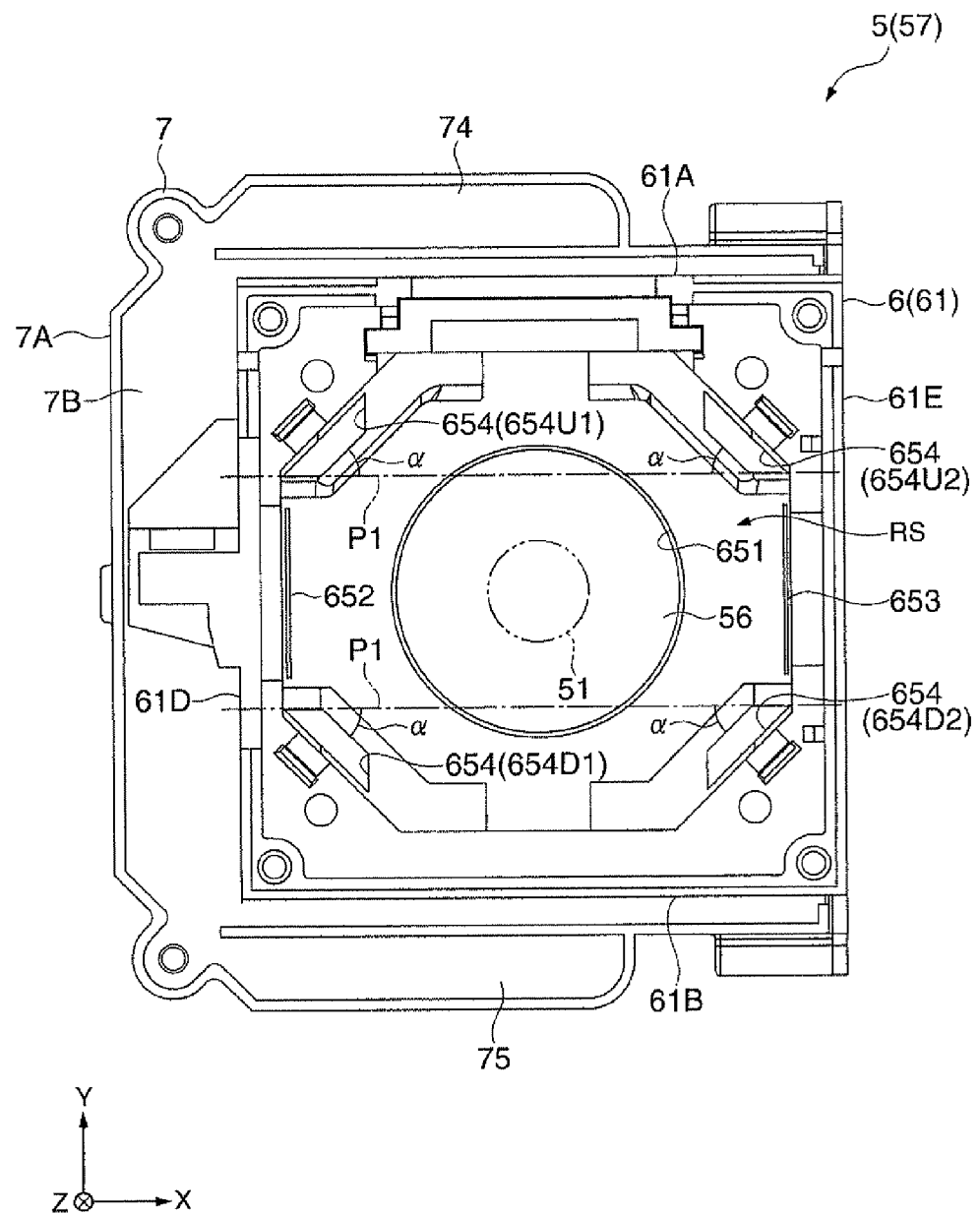
FIG. 10 is a plan view of the first main body according to the first embodiment.

FIG. 7 is a vertical cross-sectional view illustrating the light source device 5 (cross-sectional view in the Y direction). FIGS. 8 through 10 illustrate the first main body 61 as viewed from the root end side in the Z direction. More specifically, FIG. 8 is a perspective view of the first main body 61 to which the main reflection mirror 55 is attached as viewed from the root end side in the Z direction. FIGS. 9 and 10 are a perspective view and a plan view, respectively, of the first main body 61 from which the main reflection mirror 55 is removed as viewed from the root end side in the Z direction.

As illustrated in FIGS. 7 through 10, the first main body 61 has the opening 611 on the root end side in the Z direction. A step 612 whose opening area on the root end side in the Z direction is larger than its opening area on the top end side in the Z direction is formed inside the first main body 61 at a position shifted from the opening 611 toward the top end side in the Z direction. The edge of the reflection portion 552 of the main reflection mirror 55 contacts the step 612 to position the main reflection mirror 55 with respect to the first main body 61 as can be seen from FIGS. 7 and 8.

As illustrated in FIGS. 7, 9 and 10, the light shield member 65 is disposed inside the first main body 61 at a position shifted from the step 612 toward the top end side in the Z direction.

As can be seen from FIGS. 9 and 10, the light shield member 65 is a metal member which is hollow inside and has a substantially hexagon pole shape, and is positioned such that the center axis of the light shield member 65 almost agrees with the center axis of light reflected by the main reflection mirror 55.

The inside space of the light shield member 65 forms the compartment space RS in which the arc tube 51 is accommodated together with the inside of the main reflection mirror 55. The light shield member 65 prevents deterioration of the first main body 61 caused by light released from the arc tube 51 and the main reflection mirror 55 as light not entering image forming areas of the liquid crystal panels 442 but entering the first main body 61.

The light shield member 65 thus constructed has a circular opening 651 approximately at the center of the end surface on the top end side in the Z direction. The opening 651 is an opening through which light reflected by the main reflection mirror 55 is supplied to the collimating concave lens 56.

The light shield member 65 further has the openings 652 at positions corresponding to the position of the opening 61D1. The openings 652 are openings through which cooling air for cooling the arc tube 51 (on the sealing portion 513 side) disposed within the compartment space RS is introduced.

The light shield member 65 still further has the opening 653 at a position corresponding to the position of the outlet port 61E1. The opening 653 is an opening through which air having cooled the arc tube 51 and the inner surface of the main reflection mirror 55 and thus having received heat from these components is discharged via the outlet port 61E1.

In addition, as illustrated in FIGS. 9 and 10, the light shield member 65 has the four slit-shaped air supply ports 654. The air supply ports 654 correspond to openings in the appended claims through which cooling air introduced from the first duct portion 74 and the second duct portion 75 is supplied to the inside of the compartment space RS.

The air supply ports 654 are disposed outside the opening 651 through which light passes. In other words, the respective air supply ports 654 are provided outside the area through which light reflected by the main reflection mirror 55 passes. The two air supply ports 654U1 and 654U2 positioned on the top end side in the Y direction and the two air supply ports 654D1 and 654D2 positioned on the root end side in the Y direction are disposed substantially symmetric with respect to the center axis of the arc tube 51 (that is, the optical axis of light released from the arc tube 51 and the main reflection mirror 55) as viewed from the root end side in the Z direction.

The air supply ports 654U1 and 654U2 are positioned substantially symmetric with the arc tube 51 interposed therebetween as viewed from the root end side in the Z direction. That is, the air supply ports 654U1 and 654U2 are formed and disposed substantially symmetric with respect to the YZ plane passing through the center of the arc tube 51. Similarly, the air supply ports 654D1 and 654D2 are formed and disposed substantially symmetric with respect to the YZ plane.

On the other hand, the air supply ports 654U1 and 654D1 are positioned substantially symmetric with the arc tube 51 interposed therebetween as viewed from the root end side in the Z direction. That is, the air supply ports 654U1 and 654D1 are formed and disposed substantially symmetric with respect to the XZ plane passing through the center of the arc tube 51. Similarly, the air supply ports 654U2 and 654D2 are formed and disposed substantially symmetric with respect to the XZ plane.

Inclination of Opening Surface of Air supply port

As illustrated in FIG. 10, the respective opening surfaces of the air supply ports 654U1 and 654U2 are inclined in such directions as to approach each other from the root end side to the top end side in the Y direction as viewed from the root end side in the Z direction. Similarly, the respective opening surfaces of the air supply ports 654D1 and 654D2 are inclined in such directions as to approach each other from the top end side to the root end side in the Y direction as viewed from the root end side in the Z direction. That is, each of the opening surfaces is inclined to a plane P1 corresponding to the XZ plane at an inclination angle α. This inclination angle α is set at 45° in this embodiment.

Figure 11:
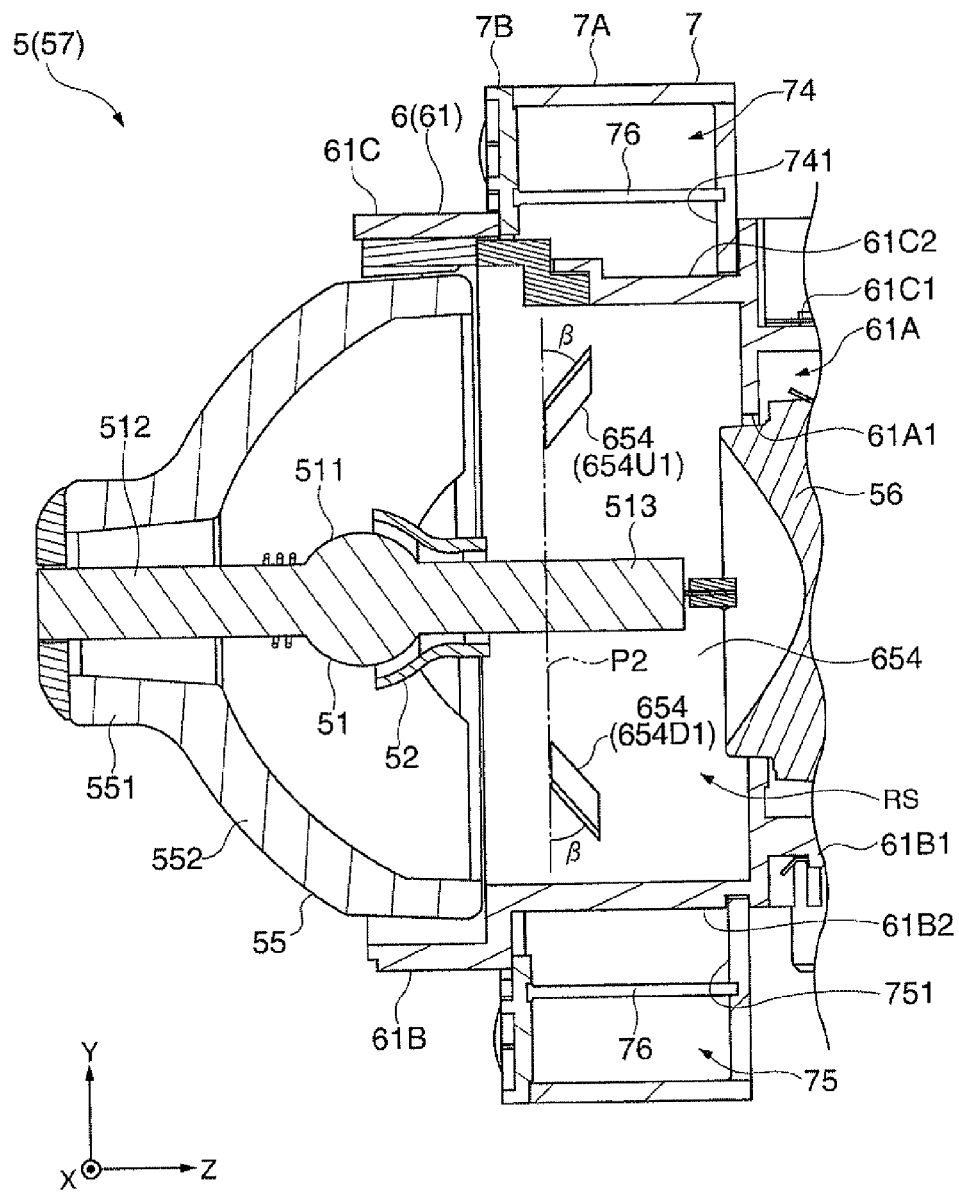
FIG. 11 schematically illustrates a vertical cross section of the light source device according to the first embodiment.

FIG. 11 schematically illustrates a vertical cross section (cross section along the YZ plane) of the light source device 5. FIG. 1 and FIGS. 12 through 15 referred to in the following description simplify or do not show a part of the structure of the light source device 5 for convenience of explanation.

As illustrated in FIG. 11, the opening surfaces of the air supply ports 654U1 and 654D1 are inclined in such directions as to shift away from each other from the root end side to the top end side in the Z direction as viewed from the top end side in the X direction. That is, each of the opening surfaces is inclined to a plane P2 corresponding to the XY plane (i.e., the opening surface of the reflection portion 552 of the main reflection mirror 55) at an inclination angle β. This inclination angle β is set at 45° in this embodiment.

Though not shown in the figures, each of the opening surfaces of the air supply ports 654U2 and 654D2 is similarly inclined to the plane P2 at the inclination angle β.

Figure 12:
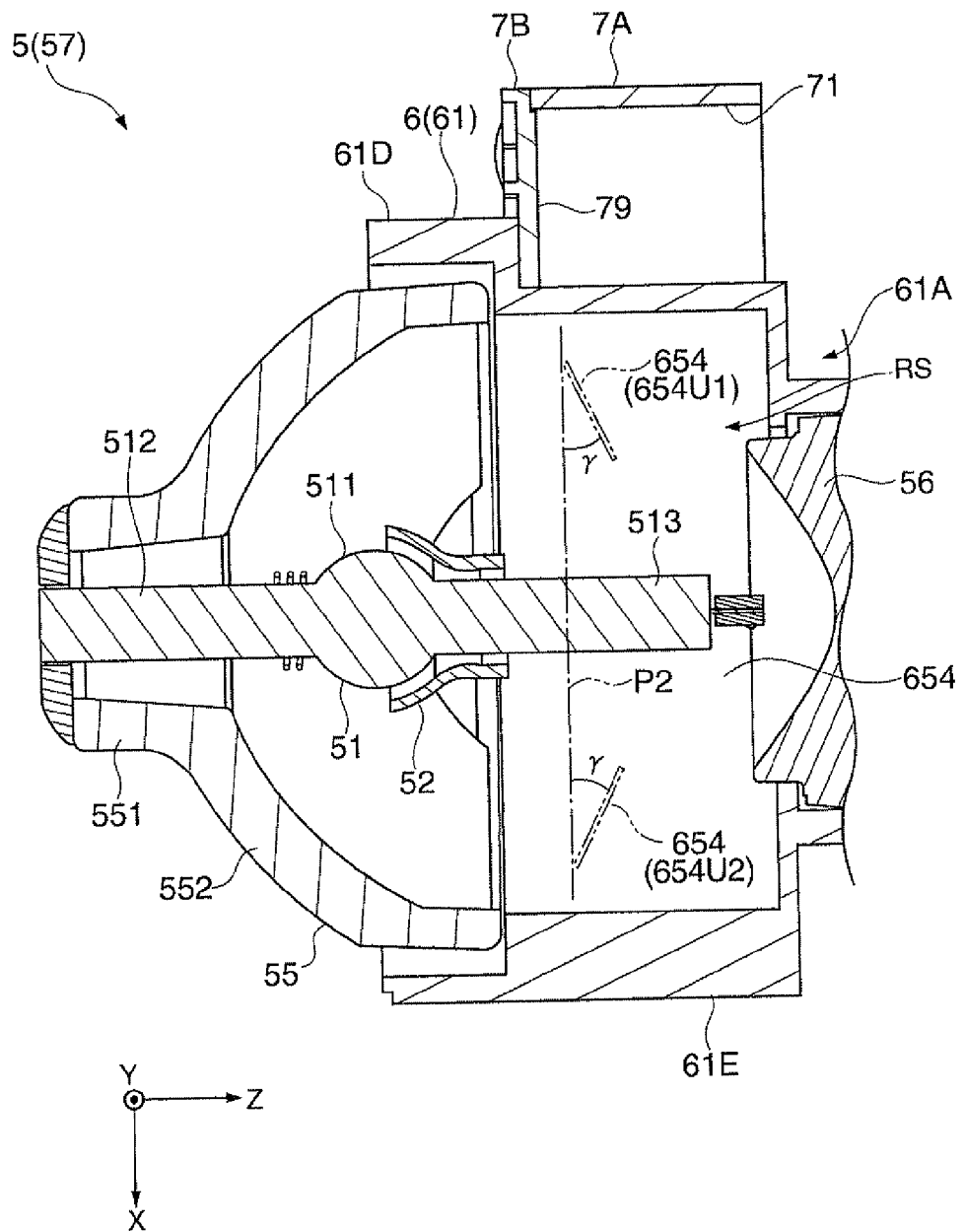
FIG. 12 schematically illustrates a horizontal cross section of the light source device according to the first embodiment.

FIG. 12 schematically illustrates the horizontal cross section (cross section along the XZ plane) of the light source device 5.

As illustrated in FIG. 12, the respective opening surfaces of the air supply ports 654U1 and 654U2 are inclined in such directions as to approach each other from the root end side to the top end side in the Z direction as viewed from the top end side in the Y direction. That is, each of the opening surfaces is inclined to the plane P2 at an inclination angle γ. It is preferable that the inclination angle γ lies in the range from 30° to 50°. In this embodiment, the inclination angle γ is set at 30°. This angle range allows cooling airs discharged from the air supply ports 654U1 and 654U2 to collide with each other at a collision position CP (see FIGS. 15 through 17) provided above the light emission portion 511.

Though not shown in the figures, each of the opening surfaces of the air supply ports 654U1 and 654U2 is inclined to the plane P2 at the inclination angle γ.

Cooling Air Channels

The channels of cooling air for cooling the light source device 5 in the normal position of the projector 1A are now explained. Since the projector 1A is installed in the normal position in the following description, the "upward" direction and the "downward" direction correspond to directions toward the top end side and the root end side in the Y direction, respectively.

Figure 13:
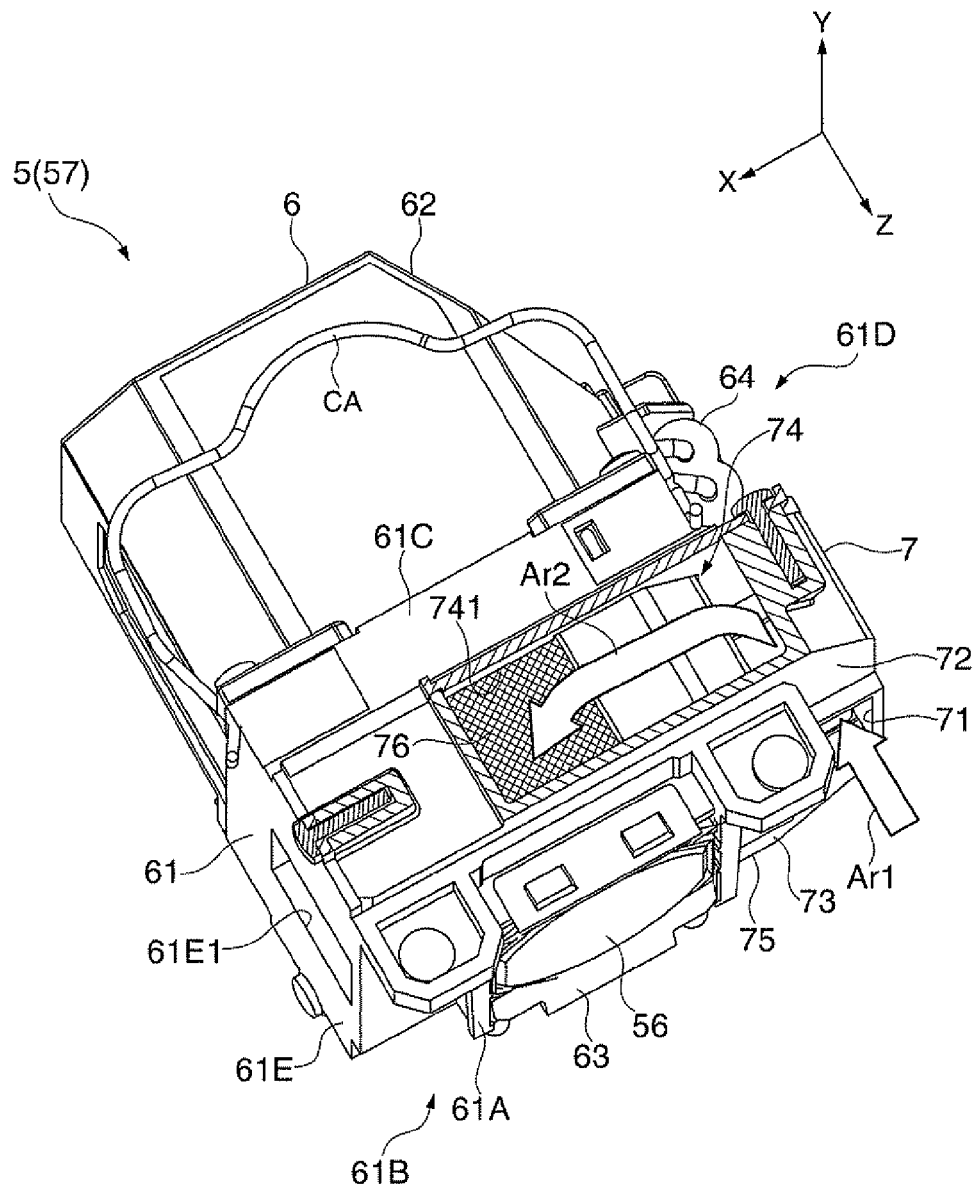
FIG. 13 schematically illustrates a channel of cooling air flowing within the duct according to the first embodiment.
Figure 14:
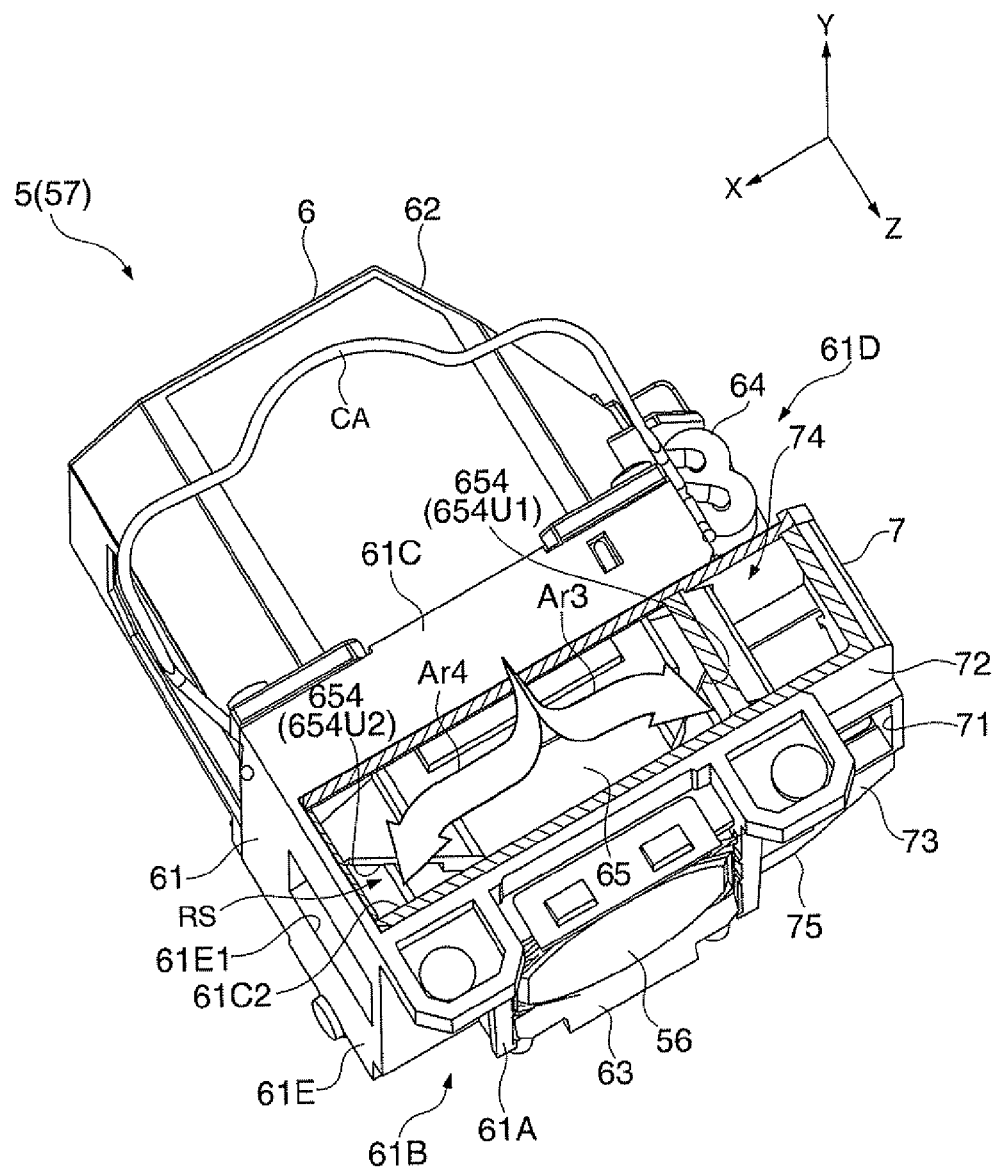
FIG. 14 schematically illustrates channels of cooling air introduced into the first main body according to the first embodiment.

FIG. 13 schematically illustrates a channel of cooling air flowing within the duct 7. FIG. 14 schematically illustrates channels of cooling air introduced from the duct 7 into the first main body 61.

As illustrated in FIG. 13, cooling air Ar1 discharged from the fan F3 is introduced through the opening 71 into the duct 7. Then, a part of the cooling air Ar1 changes its traveling direction to the upward direction by the guide of the air guide plate 7C (see FIGS. 3 and 4) rotating by gravity to flow within the first duct portion 74. The remaining part of the cooling air Ar1 is introduced through the opening 61D1 and the openings 652 into the compartment space RS.

Cooling air Ar2 flowing within the first duct portion 74 passes through the opening 741 and the metallic mesh 76 formed on the top end side in the X direction, and is guided into the first main body 61 via the opening 61C2. In this case, the in-plane pressure of the cooling air (pressure within the plane perpendicular to the flowing direction of the cooling air) passing through the metallic mesh 76 is equalized by the metallic mesh 76 disposed on the channel of the cooling air.

As a result, cooling airs Ar3 and Ar4 having the same amount are supplied through the opening 61C2 into the air supply ports 654U1 and 654U2 disposed at equal distances from the opening 741 as illustrated in FIG. 14.

Figure 15:
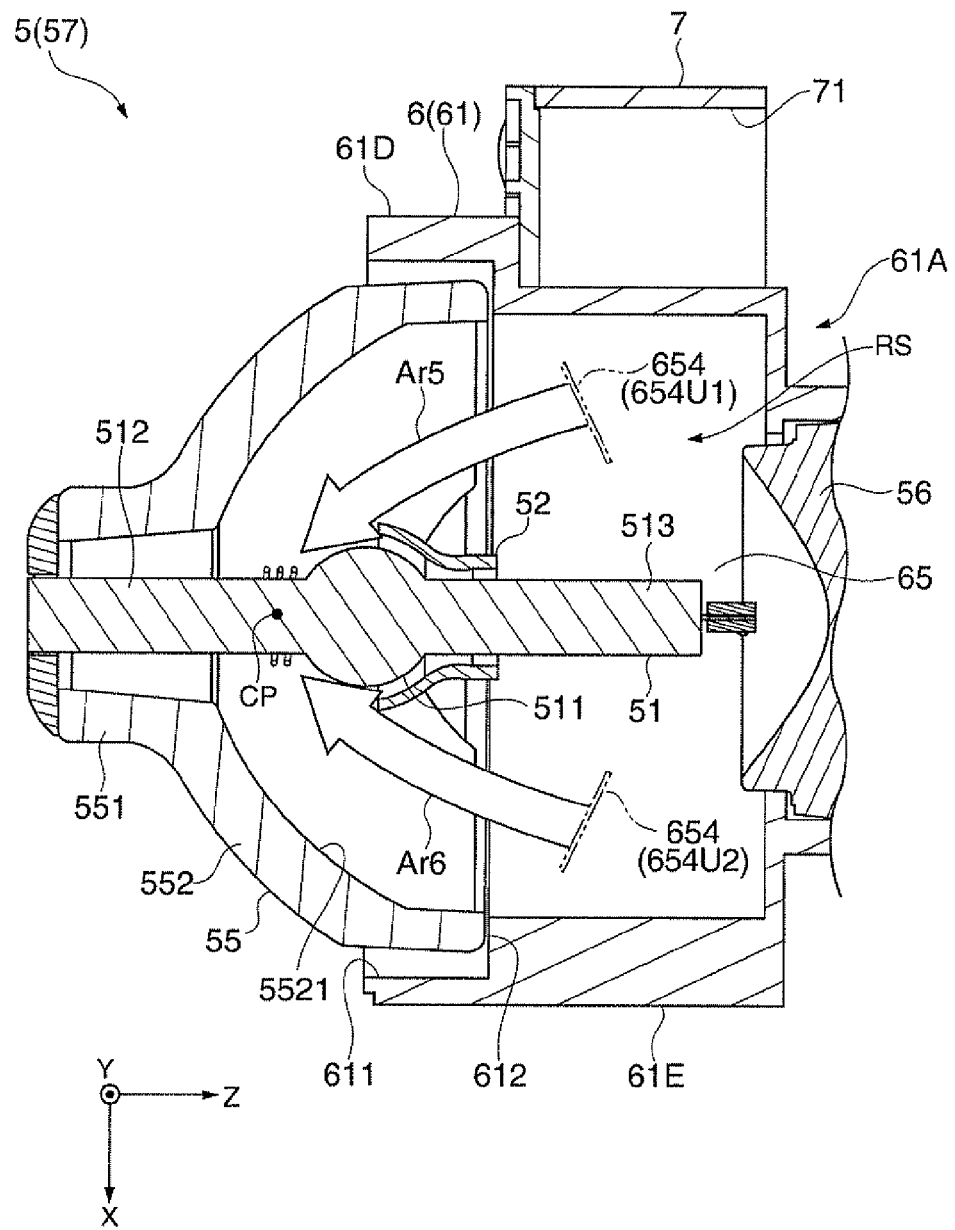
FIG. 15 schematically illustrates channels of cooling air passing through air supply ports according to the first embodiment.
Figure 16:
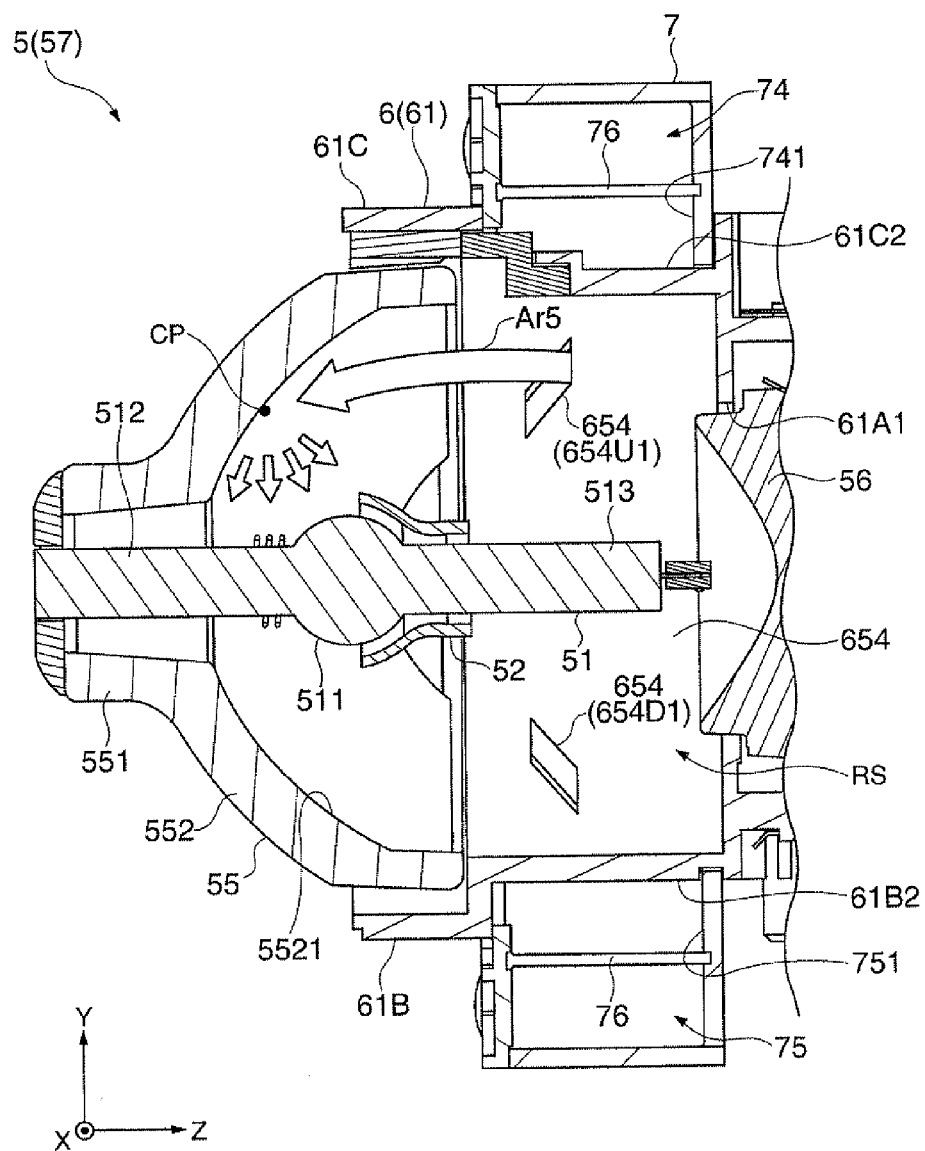
FIG. 16 schematically illustrates a channel of cooling air passing through the air supply port according to the first embodiment.

FIG. 15 schematically illustrates channels of cooling airs supplied from the air supply ports 654U1 and 654U2 as viewed from the top end side in the Y direction. FIG. 16 schematically illustrates a channel of cooling air supplied from the air supply port 654U1 as viewed from the top end side in the X direction.

The cooling airs Ar3 and Ar4 introduced into the first main body 61 become cooling airs Ar5 and Ar6 having the same amount and the same flow speed after passing through the air supply ports 654U1 and 654U2 to be introduced into the compartment space RS. As explained above, the respective air supply ports 654U1 and 654U2 are inclined to the XY plane, the XZ plane, and the YZ plane. Thus, the respective cooling airs Ar5 and Ar6 collide with each other at the collision position CP provided above the light emission portion 511 as illustrated in FIG. 15. As a result, collision let flow including turbulent flow and turning flow discretely diffused from the collision position CP is produced as illustrated in FIG. 16.

As can be seen from FIGS. 15 and 16, the collision position CP is disposed above the light emission portion 511 (at a position shifted upward from the light emission portion 511). More specifically, the collision position CP is disposed above the center of the light emission portion 511 (the center between the electrodes E1 and E2) at a position shifted toward the root end side in the Z direction, that is, positioned immediately above the sealing portion 512. In this embodiment, the collision position CP is located on the reflection surface 5521 of the main reflection mirror 55.

Thus, when the cooling airs Ar5 and Ar6 are supplied from the air supply ports 654U1 and 654U2, the cooling airs Ar5 and Ar6 flow along the reflection surface 5521 due to the Coanda effect. Accordingly, the respective cooling airs Ar5 and Ar6 can easily collide with each other at the collision position CP. Moreover, when the collision position CP is disposed on the reflection surface 5521, collision jet flow having a fixed flow speed can be constantly produced in a stable condition.

Furthermore, the slit shapes of the air supply ports 654U1 and 654U2 allow the cooling airs Ar5 and Ar6 to be supplied through the air supply ports 654U1 and 654U2 as jet flows having film-shaped cross sections. Thus, the directions of the cooling airs Ar5 and Ar6 supplied toward the collision position CP can be easily controlled, which achieves secure collision between the cooling airs Ar5 and Ar6 at the collision position CP.

Figure 17:
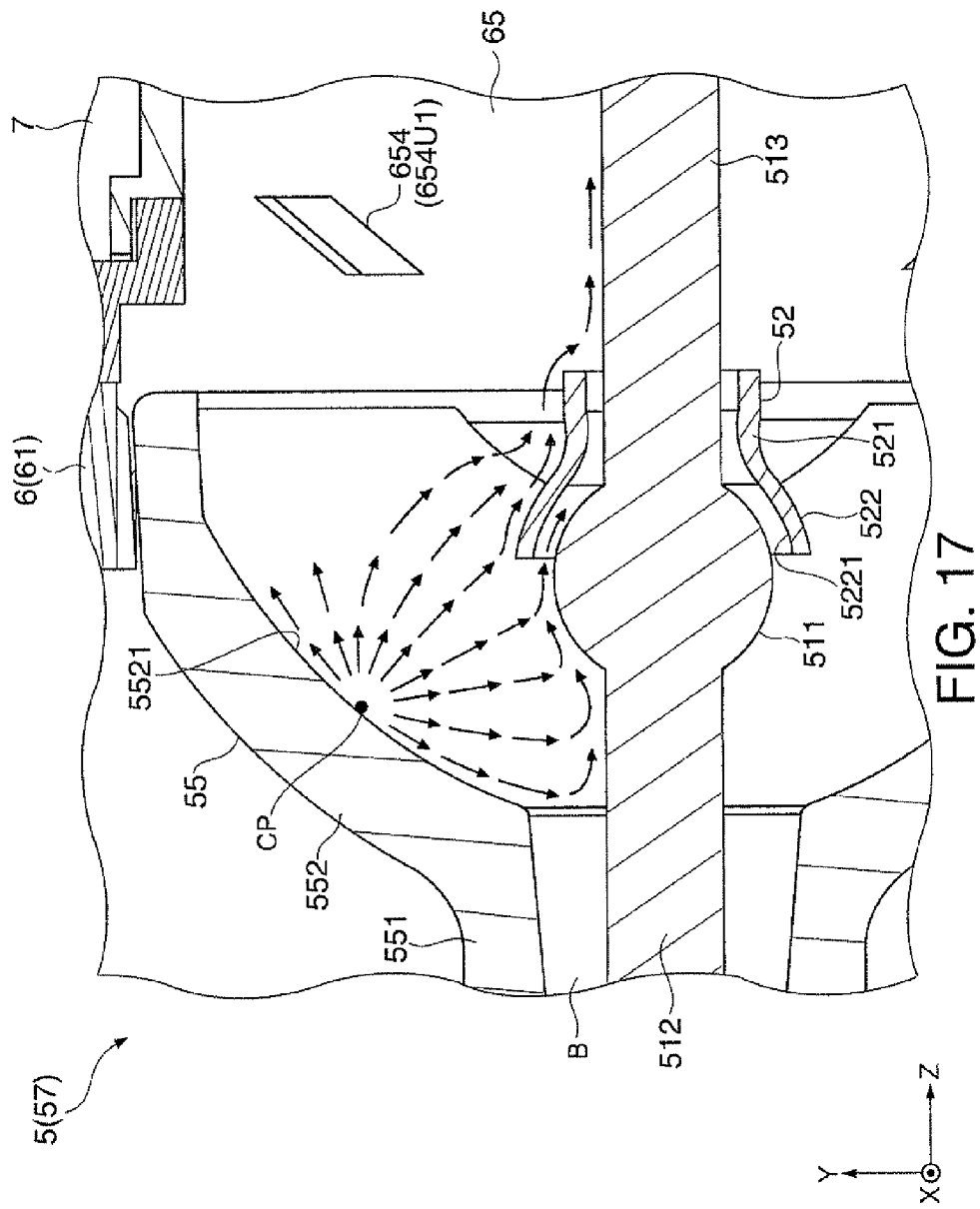
FIG. 17 schematically illustrates flow of collision jet flow according to the first embodiment.

FIG. 17 schematically illustrates the flow of collision jet flow generated by collision between the cooling airs Ar5 and Ar6.

As illustrated in FIG. 17, a part of the collision jet flow produced by collision between the cooling airs Ar5 and Ar6 flows toward the sealing portion 512 to cool the sealing portion 512. In this case, this part of the collision jet flow travels along the sealing portion 512 due to the Coanda effect. Thus, the temperature boundary layer of the sealing portion 512 decreases, which promotes heat transmission between the sealing portion 512 and the jet flow (temperature displacement).

Another part of the collision jet flow flows toward the upper part of the light emission portion 511. In this case, the light emission portion 511 is cooled by direct collision between this collision jet flow and the light emission portion 511. In addition, turbulent flow diffused by collision with the light emission portion 511 further collides with this part of the collision jet flow, which promotes further generation of turbulent flow. As a result, heat transmission from the light emission portion 511 increases, allowing the light emission portion 511 to be further cooled.

The collision jet flow traveling toward the light emission portion 511 further flows along the light emission portion 511 toward the top end side in the Z direction by the Coanda effect. This collision jet flow reduces the temperature boundary layer on the upper part of the light emission portion 511 and promotes heat transmission between the light emission portion 511 and the collision jet flow such that the upper part of the light emission portion 511 can be cooled.

The collision jet flow flowing along the light emission portion 511 further travels toward the top end side in the Z direction, and flows into the gap between the light emission portion 511 and the reflection surface 5221 of the sub reflection mirror 52. This jet flow having entered the gap effectively cools the area of the light emission portion 511 covered by the sub reflection mirror 52.

A further part of the collision jet flow travels toward the sub reflection mirror 52, and flows along the outer surface of the sub reflection mirror 52 toward the top end side in the Z direction. This jet flow flows along the sealing portion 513, and collides with cooling air introduced from the duct 7 through the opening 61D1 on the side surface 61D and the openings 652 on the light shield member 65. This collision promotes further generation of turbulent flow, and thus promotes cooling for the sealing portion 513.

A still further part of the collision jet flow generated by collision between the cooling airs Ar5 and Ar6 flows downward along the reflection surface 5521 of the main reflection mirror 55 and cools the lower part of the light emission portion 511. However, since this part of the jet flow which has a relatively high temperature after heat transmission and a low flow speed lowered before reaching the lower part of the light emission portion 511, for example, the cooling efficiency of this jet flow is lower than that of the jet flow flowing toward the upper part of the light emission portion 511. In this case, the temperature difference between the upper part where the temperature becomes the highest and the lower part where the temperature becomes lower than that of the upper part can be decreased, which contributes to prevention of deterioration of the arc tube 51.

As explained above, the air having cooled the arc tube 51 is discharge from the compartment space RS via the opening 653 on the light shield member 65 and the outlet port 61E1 on the side surface 61E. This air is sucked by the fan F4 (see FIG. 1), and discharged to the outside of the external housing 2 via the air outlet port 2B1 (see FIG. 1).

This is the mechanism associated with the cooling for the arc tube 51.

While the channels of cooling air for cooling the arc tube 51 in the normal position of the projector 1A have been discussed in this embodiment, similar channels are formed for cooling air used in the suspended position of the projector 1A as well.

More specifically, a part of cooling air introduced into the duct 7 flows within the second duct portion 75 positioned above by the guide of the air guide plate 7C rotated downward. Then, this cooling air is introduced into the first main body 61 through the metallic mesh 76 and the openings 751 and 61B2, and divided into two equal parts flowing toward the air supply ports 654D1 and 654D2.

The cooling airs supplied from the air supply ports 654D1 and 654D2 collide with each other at a collision position provided as a symmetric position of the collision position CP with respect to the center axis of the arc tube 51 to generate collision jet flow similar to that in the normal position. The arc tube 51 (particularly the upper part of the light emission portion 511) is cooled by this collision jet flow and the cooling air introduced through the openings 652. Then, the air having cooled the arc tube 51 is discharged to the outside of the compartment space RS through the outlet port 61E1.

According to the projector 1A described in this embodiment, the following advantages are offered.

When the projector 1A is installed in the normal position, the cooling airs Ar5 and Ar6 having passed through the air supply ports 654U1 and 654U2 collide with each other at the collision position CP determined above the light emission portion 511. As a result, collision jet flow containing turbulent flow and turning flow discretely diffused from the collision position CP is generated within the compartment space RS. This collision jet flow supplied to the light emission portion 511 reduces the temperature boundary layer of the light emission portion 511, and promotes heat transmission between the light emission portion 511 and the collision jet flow such that the light emission portion 511 can be cooled.

When cooling air flowing along the reflection surface 5521 toward the light emission portion 511 is supplied from one air supply port, there is a possibility that this cooling air flows downward from the light emission portion 511. In this case, the upper part of the light emission portion 511 is not appropriately cooled.

According to this embodiment, however, collision jet flow is generated above the light emission portion 511, and adequately supplied to the upper part of the light emission portion 511. Accordingly, improvement of the cooling efficiency for the arc tube 51, and thus elongation of the life of the arc tube 51 can be achieved.

When the projector 1A is installed in the suspended position, similar advantages can be provided by using collision jet flow generated by collision of cooling airs supplied from the air supply ports 654D1 and 654D2.

When the projector 1A is installed in the normal position, the flow speeds and flow amounts of the cooling airs Ar5 and Ar6 passing through the air supply ports 654U1 and 654U2 are set at the equal flow speeds and flow amounts. In this case, the collision position CP where the cooling airs Ar5 and Ar6 collide with each other can be easily controlled. Moreover, non-uniformity in the flow speed distribution of the collision jet flow generated at the collision position CP, that is, shift of the flow speed distribution of the collision jet flow toward one of the air supply ports 654 can be prevented, which contributes to secure supply of the collision jet flow toward the light emission portion 511. Accordingly, the cooling effect for the arc tube 51 can further improve.

This advantage can be provided by the cooling air supplied from the air supply ports 654D1 and 654D2.

According to the light source device 5 including the sub reflection mirror 52, the amount of light emitted from the light emission portion 511 and entering the lens array 411 becomes larger than the corresponding amount in a structure which does not include the sub reflection mirror 52. Thus, the efficiency of using light emitted from the light emission portion 511 for image formation increases.

The collision jet flow is generated at the collision position CP above the light emission portion 511. In this case, the jet flow can be introduced into the gap between the outer surface of the light emission portion 511 and the reflection surface 5221 of the sub reflection mirror 52. Thus, the area of the light emission portion 511 covered by the sub reflection mirror 52 can be cooled, which achieves both improvement of light using efficiency and improvement of cooling efficiency for the entire art tube 51.

The amount of light emitted from the light emission portion 511 and entering the lens array 411 can be increased by using the main reflection mirror 55 and the sub reflection mirror 52. Thus, the efficiency of using light emitted from the light emission portion 511 for image formation improves.

The collision position CP is disposed on the substantially concavely curved reflection surface 5521. In this case, the cooling airs Ar5 and Ar6 supplied from the respective air supply portions 654U1 and 654U2 travel along the reflection surface 5521 toward the collision position CP. Since the respective cooling airs Ar5 and Ar6 are guided by the reflection surface 5521, the cooling airs Ar5 and Ar6 securely collide with each other at the collision position CP. Accordingly, the collision position CP, i.e., the generation point of the collision jet flow can be further easily controlled.

The collision position where the cooling airs supplied from the respective air supply ports 654D1 and 654D2 is determined at a substantially symmetric position of the collision position CP with the arc tube 51 interposed therebetween, and located on the reflection surface 5521. Thus, advantages similar to those explained above can be offered even when the projector 1A is installed in the suspended position.

The collision position CP is disposed above the light emission portion 511. In this case, the collision jet flow can be securely supplied to the upper part of the light emission portion 511 where the temperature easily rises during lighting of the arc tube 51. Moreover, supply of a large amount of jet flow toward the lower part of the light emission portion 511 as a low-temperature area can be avoided. Thus, not only effective cooling for the upper part of the light emission portion 511 but also reduction of the temperature difference between the upper part and the lower part of the light emission portion 511 can be achieved, which prevents deterioration of the arc tube 51.

Since the collision position CP is disposed on the reflection surface 5521, the collision jet flow generated at the collision position CP can be bent by the reflection surface 5521 and supplied toward the light emission portion 511. Accordingly, the amount of the cooling air supplied toward the light emission portion 511 increases, which further improves the cooling efficiency for the light emission portion 511, and thus the cooling efficiency for the arc tube 51.

The respective air supply ports 654U1 and 654U2 through which cooling air flows in the normal position are located above the arc tube 51. In this case, the channels of the cooling airs from the air supply ports 654U1 and 654U2 to the collision position CP determined above the light emission portion 511 become shorter than those channels in a structure which has corresponding air supply ports below the arc tube 51. Thus, the cooling airs Ar5 and Ar6 collide with each other without greatly decreasing their flow speeds before reaching the collision position CP, and generate high-speed collision jet flow. Accordingly, the cooling efficiency for the arc tube 51 further increases.

Advantages similar to those described above can be provided by the air supply ports 654D1 and 654D2 through which cooling air flows in the suspended position.

The respective air supply ports 654U1 and 654U2 are disposed substantially symmetric with the arc tube 51 interposed therebetween. According to this arrangement, the lengths from the collision position CP to the air supply ports 654U1 and 654U2 (distances) become substantially equal. In this case, shift of the flow speed distribution of the collision jet flow toward one of the air supply ports 654 can be avoided. Moreover, since the cooling airs flowing toward the collision position CP are supplied through the respective air supply ports 654U1 and 654U2 with inclination of substantially the same angle, the shift of the flow speed distribution of the collision jet flow can be further prevented. Thus, the collision jet flow can be securely supplied toward the light emission portion 511, which further increases the cooling efficiency for the arc tube 51.

Similarly, the air supply ports 654D1 and 654D2 are disposed substantially symmetric with the arc tube 51 interposed therebetween, and the cooling airs are supplied from the air supply ports 654D1 and 654D2 with inclination of substantially the same angle to the XY plane. Thus, advantages similar to those described above can be offered by the air supply ports 654D1 and 654D2.

The filmy shaped cooling airs Ar5 and Ar6 are supplied from the respective slit-shaped air supply ports 654U1 and 654U2. In this structure, the flow of the cooling airs Ar5 and Ar6 can be stabilized, and thus the flow directions of the cooling airs Ar5 and Ar6 can be easily controlled. Moreover, since the cooling airs Ar5 and Ar6 are narrowed for supply, the pressure drop of the cooling airs Ar5 and Ar6 before reaching the collision position CP is prevented, which contributes to secure generation of the collision jet flow mentioned above.

Similarly, the air supply ports 654D1 and 654D2 through which cooling air flows when the projector 1A is installed in the suspended position have slit shapes. Thus, advantages similar to those described above can be provided by the air supply ports 654D1 and 654D2.

The pressure of the cooling air Ar2 within the plane mentioned above can be equalized while the cooling air Ar2 flowing from the inside of the first duct portion 74 is passing through the holes of the metallic mesh 76. In this case, the cooling air Ar2 supplied from the opening 741 and the opening 61C2 can be divided into equal two parts of the cooling airs Ar3 and Ar4 flowing into the respective air supply ports 654U1 and 654U2. Thus, the cooling airs Ar5 and Ar6 having the same amount and the same flow speed can be easily supplied from the air supply ports 654U1 and 654U2, which further prevents the non-uniformity in the flow speed distribution of the collision jet flow mentioned above.

The metallic mesh 76 is attached to the opening 741. Thus, scattering of broken pieces of the arc tube 51 to the outside of the housing 57 when the arc tube 51 is broken can be prevented.

Moreover, the duct 7 can divide the cooling air discharged from the fan F3 into two parts flowing into the air supply ports 654U1 and 654U2. Thus, increase in the number of the parts of the projector 1A and the size of the projector 1A can be more reduced than in a structure which includes a fan and a duct for each of the air supply ports 654U1 and 654U2.

The metallic mesh 76 is provided on the opening 751 of the second duct portion 75 as well. Thus, advantages similar to those described above can be offered when the projector 1A is installed in the suspended position.

Modification of First Duct Portion and Second Duct Portion

According to the projector 1A described above, the metallic meshes 76 are provided on the openings 741 and 751 to equalize the in-plane pressure of the cooling airs having flowed through the first duct portion 74 and the second duct portion 75 and supply cooling airs having the same flow amount and the same flow speed to the two air supply ports 654. However, other structures may be adopted as long as they can supply cooling airs having the same amount and the same flow speed to the two air supply ports 654.

Figure 18:
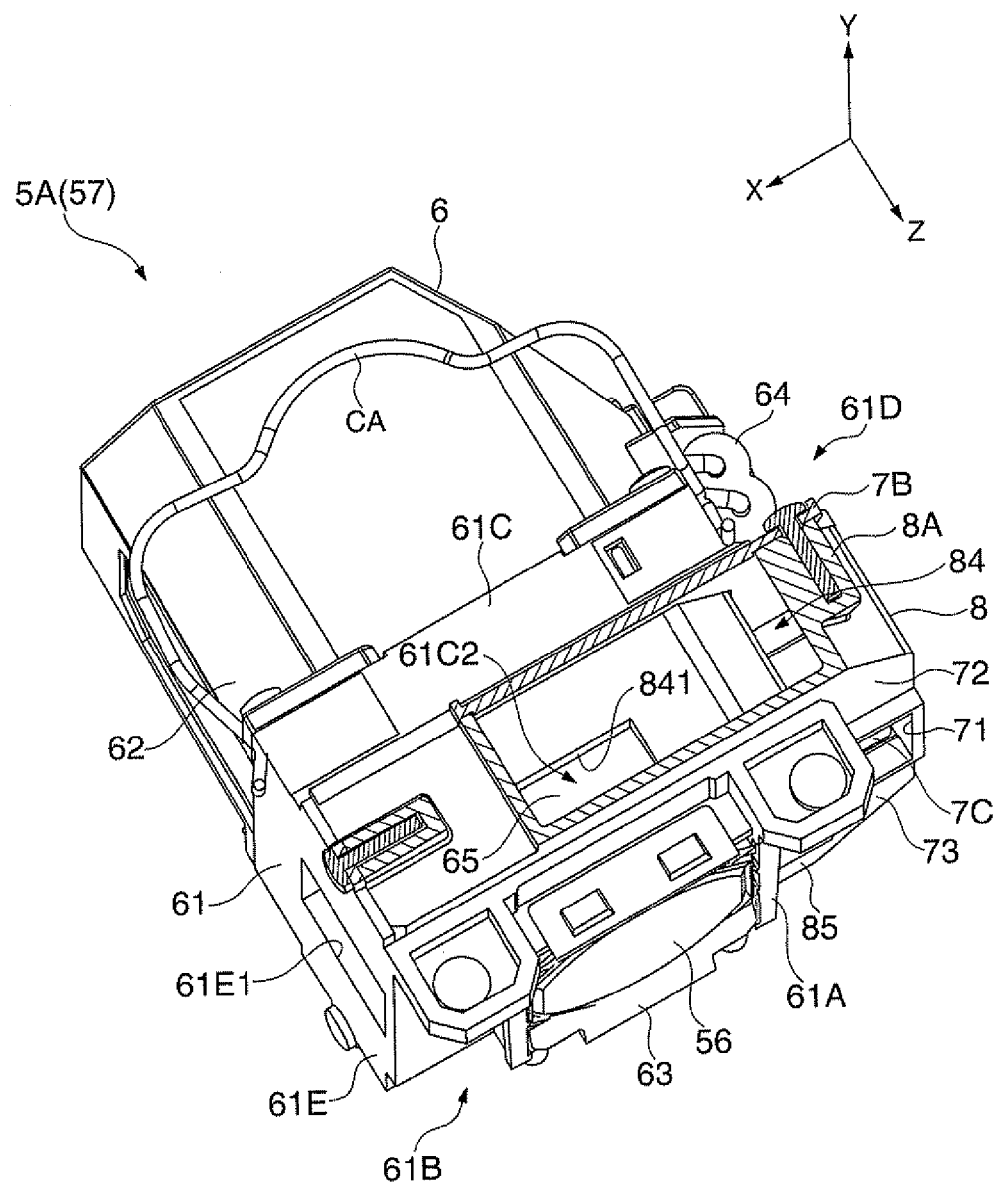
FIG. 18 is a perspective view of a light source device as a modification of the first embodiment.

FIG. 18 is a perspective view illustrating a light source device 5A as a modification of the light source device described above. FIG. 18 shows the light source device 5A from which a first duct portion 84 of a duct 8 is cut along the XZ plane and removed.

For example, the light source device 5A as a modification of the light source device 5 has structure similar to that of the light source device 5 except that the duct 8 is provided in place of the duct 7.

Similarly to the duct 7, the duct 8 is attached to the bottom surface 61B, the top surface 61C, and the side surface 61D, and has a function of supplying cooling air discharged from the fan F3 toward the opening 61D1 and the opening 61B2 or opening 61C2. As illustrated in FIG. 18, the duct 8 has a duct main body 8A and the plate body 7B positioned on the top end side and the root end side in the Z direction, respectively, and the air guide plate 7C supported within the duct main body 8A in such a condition as to be freely rotatable. The duct main body 8A and the plate body 7B are fixed to each other by a screw or the like.

The duct 8 has structure similar to that of the duct 7 except that a first duct portion 84 and a second duct portion 85 are provided in place of the first duct portion 74 and the second duct portion 75.

Cooling air introduced from the opening 71 and allowed to change its flow direction to the upward direction by the air guide plate 7C (not shown) rotatable by gravity travels toward the openings 61C2 or 61B2 while guided by the first duct portion 84 or the second duct portion 85.

To the first duct portion 84, an opening 841 corresponding to a passage port in the appended claims is disposed at the end on the top end side in the X direction at a position shifted toward the top end side in the Z direction. The metallic mesh 76 is not attached to the opening 841. The opening area of the opening 841 is smaller than that of the opening 741.

In more detail, the opening 841 has an opening area sufficient for equalizing the in-plane pressure of cooling air passing through the opening 841 (pressure within the plane perpendicular to the flowing direction of the cooling air). More specifically, this opening area is smaller than the average area of the cross section of the first duct portion 84 perpendicular to the flow direction of the cooling air.

In this structure, the cooling air passing through the opening 841 can be similarly divided into two equal parts flowing into the air supply ports 654U1 and 654U2 such that the two parts have the same flow amount and the same flow speed.

Though not shown in the figure, the second duct portion 85 which supplies cooling air to the air supply ports 654D1 and 654D2 has an opening similar to the opening 841. Thus, cooling air having passed through the inside of the second duct portion 85 can be divided into two parts flowing into the air supply ports 654D1 and 654D2 through the opening 61B2 such that the two parts have the same flow amount.

Second Embodiment

A second embodiment of the invention is hereinafter described.

A projector in this embodiment has structure similar to that of the projector 1A described above. According to the projector 1A, the two air supply ports 654 positioned above the arc tube 51 are used as air supply ports for supplying cooling airs to the collision position CP located above the light emission portion 511. According to the projector in this embodiment, however, the two air supply ports 654 positioned below the arc tube 51 are used. This is the different point between the projector in this embodiment and the projector 1A. In the following description, the same reference numbers are given to parts same or substantially same as the corresponding parts described above, and the same explanation is not repeated.

Figure 19:
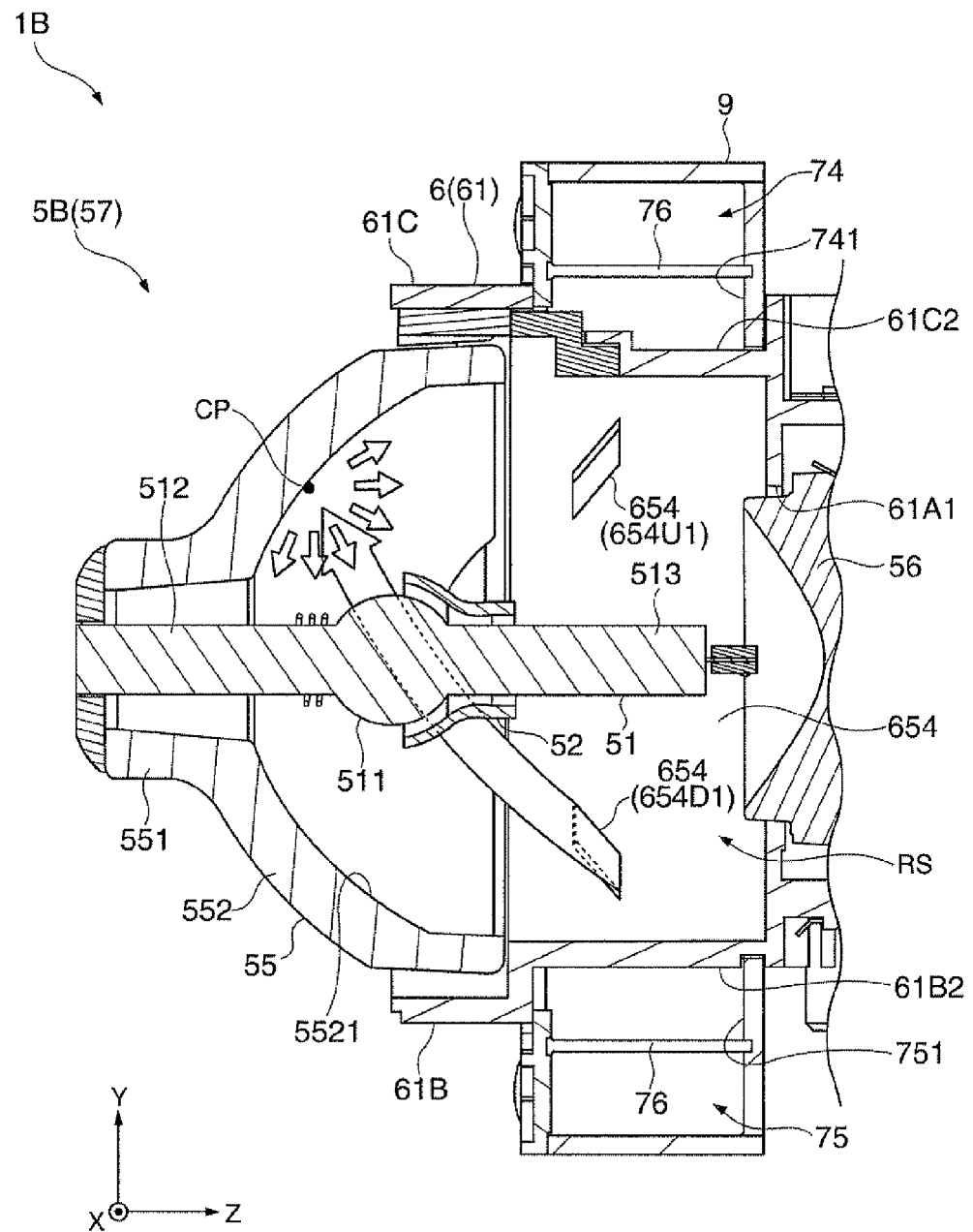
FIG. 19 schematically illustrates a vertical cross section of a light source device included in a projector according to a second embodiment of the invention.

FIG. 19 schematically illustrates a vertical cross section of a light source device 5B included in a projector 1B according to this embodiment.

The projector 1B in this embodiment has structure similar to that of the projector 1A described above except that the light source device 5B is provided in place of the light source device 5. As can be seen from FIG. 19, the light source device 5B has structure similar to that of the light source device 5 except that a duct 9 is provided in place of the duct 7.

The duct 9 having structure similar to that of the duct 7 is attached to the container main body 6. The duct 9 introduces cooling air discharged from the fan F3 to the inside, and guides the cooling air toward either the opening 741 on the first duct portion 74 or the opening 751 on the second duct portion 75 as the opening positioned below by using an air guide plate rotatable by gravity. Thus, the cooling air is introduced into the container main body 6 via either the opening 61C2 or the opening 61B2 of the container main body 6 and either the air supply ports 654U1 and 654U2 or the air supply ports 654D1 and 654D2 as the opening and the two air supply ports positioned below.

While the duct 9 has the structure similar to that of the duct 7 in this embodiment, the duct 9 may have structure similar to that of the duct 8. The duct 9 is only required to introduce cooling air toward the two air supply ports positioned below the arc tube 51.

The flow amounts and the flow speeds of the cooling airs supplied from the respective air supply ports 654D1, 654U2, 654D1, and 654D2 are equalized in this embodiment as well.

However, when the respective air supply ports 654U1, 654U2, 654D1, and 654D2 are positioned below the arc tube 51, the supply directions of the cooling airs from the air supply ports 654U1, 654U2, 654D1, and 654D2 are upward directions so as to supply the cooling airs toward the collision position CP disposed above the light emission portion 511. Thus, as illustrated in FIG. 19, the cooling airs supplied from the two supply ports 654D1 and 654D2 (only the air supply port 654D1 is shown in FIG. 19) positioned below are supplied toward the collision position CP when the projector 1B is in the normal position. Then, the cooling airs collide with each other at the collision position CP, thereby generating collision jet flow. This collision jet flow cools the light emission portion 511 (particularly the upper part of the light emission portion 511 covered by the sub reflection mirror 52) and the sealing portions 512 and 513 in the manner similar to those in the light source devices 5 and 5A. Moreover, turbulent flow generated by the collision between the respective flows of the collision jet flow effectively cools the upper part of the light emission portion 511.

When the projector 1B is in the suspended position, cooling airs are supplied from the air supply ports 654U1 and 654U2 positioned below the arc tube 51 toward the collision position CP determined above the light emission portion 511 in accordance with the suspended position. Then, the cooling airs collide with each other at the collision position CP. This collision generates collision jet flow which effectively cools the arc tube 51 (particularly the light emission portion 511) similarly to the condition of the normal position.

According to the projector 1B in this embodiment described above, advantages similar to those of the projector 1A can be offered. In addition, in the structure which positions the two air supply ports 654 for supplying cooling air at positions below the arc tube 51, the channel length of the cooling air between the respective air supply ports 654 and the collision position CP becomes longer. In this case, the air within the compartment space RS is stirred during supply of the air, which improves the cooling effect for the entire area of the arc tube 51.

Third Embodiment

A third embodiment according to the invention is hereinafter described.

A projector in this embodiment has structure similar to that of the projector 1B described above. According to the projector 1B, cooling air is directly supplied from the two air supply ports 654 positioned below the arc tube 51 toward the collision position CP for collision thereat. According to the projector in this embodiment, however, cooling air is supplied from the two air supply ports positioned below and along the reflection surface 5521 of the main reflection mirror 55 for collision at the collision position. This is the different point between the projector in this embodiment and the projector 1B. In the following description, the same reference numbers are given to same parts or substantially same as the corresponding parts described above, and the same explanation is not repeated.

Figure 20:
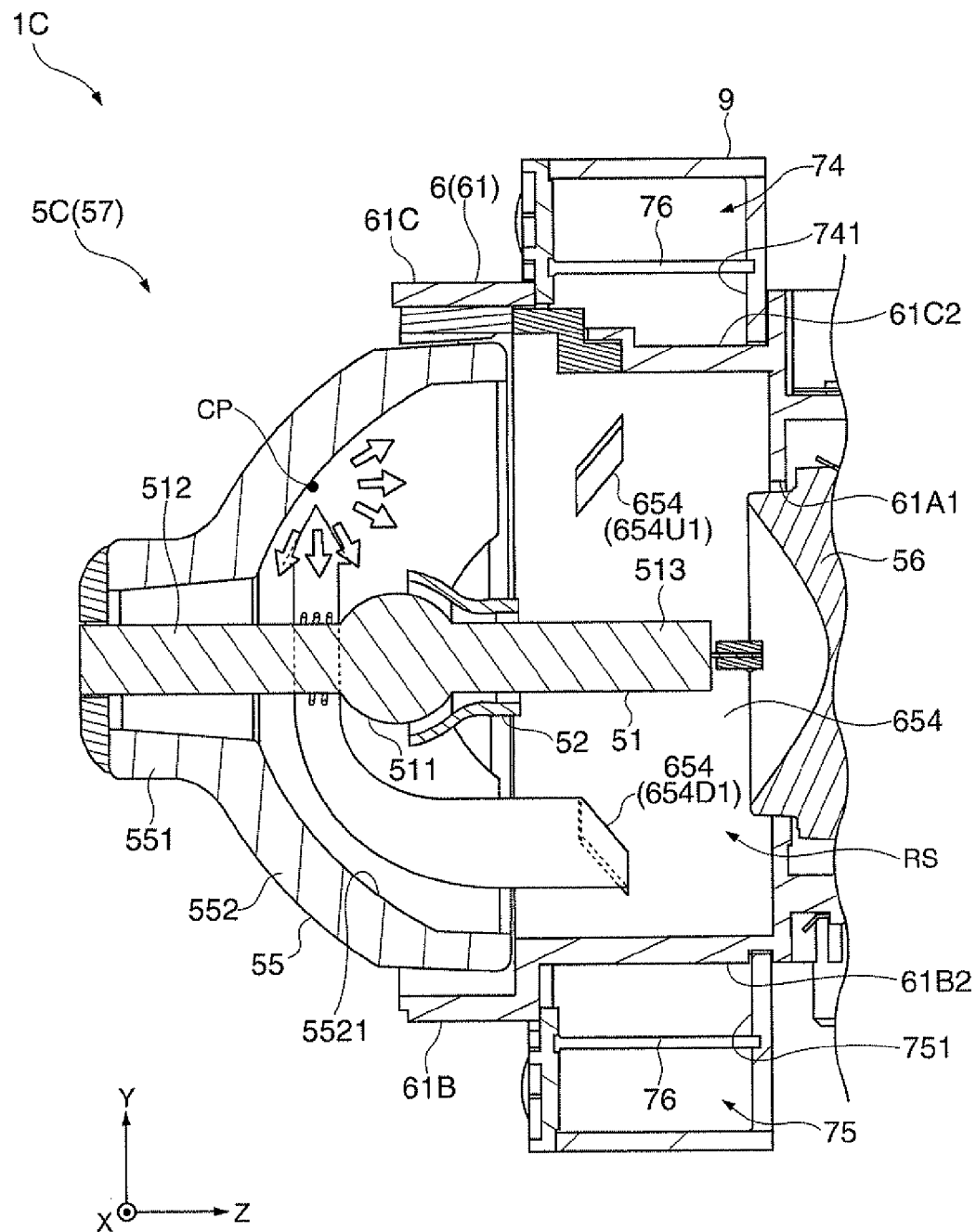
FIG. 20 schematically illustrates a vertical cross section of a light source device included in a projector according to a third embodiment of the invention.

FIG. 20 schematically illustrates a vertical cross section of a light source device 5C included in a projector 1C according to this embodiment.

The projector 1C in this embodiment has structure similar to that of the projector 1B except that the light source device 5C is provided in place of the light source device 5B. As can be seen from FIG. 20, the light source device 5C has structure similar to that of the light source device 5B except that the supply directions of cooling airs from the respective air supply ports 654 are different from the corresponding directions in the light source device 5B.

More specifically, according to the light source device 5C, cooling air is introduced via the duct 9 into each of the two air supply ports 654 (the air supply ports 654D1 and 654D2 in the normal position) among the air supply ports 654 (654U1, 654U2, 654D1, and 654D2) located below the arc tube 51 as viewed in the optical axis direction of the arc tube 51. Then, the cooling airs are supplied from the two air supply ports 654 positioned below toward the reflection surface 5521 in directions substantially parallel with the center axis of the arc tube 51, and travel along the reflection surface 5521 to reach the collision position CP mentioned above. The respective cooling airs collide with each other at the collision position CP, thereby generating the collision jet flow mentioned above for cooling the arc tube 51. This collision jet flow effectively cools the arc tube 51 (particularly the upper part of the light emission portion 511 covered by the sub reflection mirror 52) similarly to the light source devices 5, 5A, and 5B.

When the projector 1C is in the suspended position, cooling airs are supplied from the air supply ports 654U1 and 654U2 positioned below the arc tube 51 toward the reflection surface 5521 in directions substantially parallel with the center axis of the arc tube 51. Then, the cooling airs having flowed along the reflection surface 5521 collide with each other at the collision position CP determined in correspondence with the suspended position, and generate collision jet flow. This collision jet flow effectively cools the arc tube 51 (particularly the light emission portion 511) similarly to the condition of the normal position.

In this embodiment, the cooling airs having the same flow amount and the same flow speed are similarly supplied from the air supply ports 654U1, 654U2, 654D1, and 654D2.

According to the projector 1C in this embodiment described herein, advantages similar to those of the projector 1B can be offered. Moreover, the cooling airs supplied from the two air supply ports 654 positioned below the arc tube 51 can securely collide with each other at the collision position CP by the guide of the reflection surface 5521 toward the collision position CP.

Modifications of Embodiments

The invention is not limited to the respective embodiments described and depicted herein but may be practiced otherwise without departing from the scope and spirit of the invention. Therefore, various modifications and improvement and the like including the following changes may be made.

According to the respective embodiments, cooling air is used as cooling fluid. However, the cooling fluid may be liquids such as water and ethylene glycol as long as the whole area of the light source device 5 is insulated.

According to the respective embodiments, the collision position CP where cooling airs collide with each other within the compartment space RS is located above the light emission portion 511 at a position shifted toward the root end side in the Z direction. However, the collision position may be disposed at an arbitrary position as long as the position is located above the light emission portion 511 (a position shifted upward from the light emission portion 511) as viewed from the top end side or the root end side of the light emission portion 511 in the Z direction or as viewed from the top end side or the root end side of the light emission portion 511 in the X direction and allows the generated collision jet flow to be appropriately supplied to the light emission portion 511. Similarly, the collision position is not required to be located on the reflection surface 5521.

According to the respective embodiments, the air supply ports 654U1 and 654U2 supply the cooling airs Ar5 and Ar6 having the same flow speed and the same flow amount. However, the flow speed and the flow amount of the cooling air supplied from one of the air supply ports may be higher than the flow speed and flow amount of the cooling air supplied from the other air supply port. In this case, non-uniformity is produced in the flow speed distribution of the generated collision jet flow. Thus, the collision position is controlled according to the non-uniformity such that the collision jet flow can be appropriately supplied to the light emission portion 511.

According to the respective embodiments, each of the light source devices 5 and 5A includes the sub reflection mirror 52 as the first reflection member. However, the sub reflection mirror 52 may be eliminated.

According to the first embodiment, the two air supply ports 654 positioned above the arc tube 51 are used as the air supply ports through which cooling airs pass in each of the normal position and the suspended position of the projector 1A. According to the second and the third embodiments, the two air supply ports 654 positioned below the arc tube 51 are used as the corresponding air supply ports. However, the two air supply ports 654 located at least on one of diagonal lines of a rectangle having vertexes at the four air supply ports 654 may be used as the corresponding air supply ports.

The air supply ports 654U1 and 654U2 formed and disposed substantially symmetric with the arc tube 51 interposed therebetween in the respective embodiments are not required to be arranged in this condition. Moreover, the respective air supply ports 654U1 and 654U2 having slit shapes are not required to have these shapes. Thus, the positions and shapes of the air supply ports 654U1 and 654U2 may be arbitrarily determined as long as the generated collision jet flow can be supplied to the light emission portion 511. The same is applicable to the air supply ports 654D1 and 654D2.

According to the respective embodiments, the metallic mesh 76 as the tabular member is provided on the opening 741 of the duct 7, or the opening 841 having a smaller opening area than the average cross-sectional area of the first duct portion 84 is provided on the first duct portion 84 so as to divide cooling air into two equal parts supplied to the two air supply ports 654. However, cooling air may be divided by other methods. For example, a mesh synthetic resin member may be used in lieu of the metallic mesh 76. Alternatively, a fan and a duct may be provided for each of the air supply ports 654 for supplying cooling air to the corresponding air supply port 654.

According to the respective embodiments, the air supply ports 654 through which cooling air passes to be introduced into the compartment space RS are formed on the light shield member 65 accommodated in the first main body 61. However, the air supply ports 654 may be provided on the first main body 61, for example. Thus, the air supply ports 654 may be any openings as long as they can introduce cooling fluid into the container body.

According to the respective embodiments, each of the projectors 1A through 1C has the three liquid crystal panels 442 (442R, 442G, and 442B). However, the invention is applicable to a projector having two or a smaller number, or four or a larger number of liquid crystal panels.

According to the respective embodiments, the optical unit 4 has a substantially L-shaped structure in the plan view. However, a structure having a substantially U shape in the plan view may be employed, for example.

According to the respective embodiments, the transmission type liquid crystal panels 442 each of which has a light entrance surface and a light exit surface as separate surfaces are used. However, reflection type liquid crystal panels each of which has a surface which functions both as a light entrance surface and a light exit surface may be employed.

According to the respective embodiments, the projectors 1A through 1C including the liquid crystal panels 442 as light modulation devices have been discussed as examples. However, light modulation devices having other structures may be used as long as they can form image light by modulating received light according to image information. For example, the invention is applicable to a projector which includes a light modulation device other than a liquid crystal type such as a device including micromirrors. When this type of light modulation device is used, the light entrance side and light exit side polarization plates 443 and 445 can be eliminated.

According to the respective embodiments, the front-type projectors 1A through 1C whose projection direction of image light with respect to the projection surface almost agrees with the viewing direction of an image formed by the image light have been discussed as examples. However, the invention is applicable to a rear-type projector whose projection direction and viewing direction are opposite to each other.

According to the respective embodiments, the light source devices 5 and 5A through 5C are included in the projectors 1A through 1C. However, the light source devices 5 and 5A through 5C may be incorporated in an illumination device such as a desk lamp.

The technology of the invention can be applied to a light source device including a discharge light emission type arc tube, and is particularly suited for a light source device included in a projector.

What is claimed is:

1. A light source device comprising:
    an arc tube having a light emission portion containing a pair of electrodes and configured to emit light by discharges induced between the pair of the electrodes;
    a first reflection member that reflects the light emitted by the light emission portion; and
    a container body that accommodates the arc tube, the container body has a space in which the arc tube is accommodated, and a plurality of openings through which cooling fluids introduced from the outside of the container body are supplied into the space,
    the plural openings are formed at positions that allow the cooling fluids passing through the openings to be guided along the first reflection member and to collide with each other at a collision position above the light emission portion, and
    the collision position is a single collision position for all of the plural openings being disposed on a reflection surface of the first reflection member.

2. The light source device according to claim 1, wherein the plural openings allow the cooling fluids to pass substantially at the same flow speed.

3. The light source device according to claim 1, wherein the first reflection member covers an area of one side of the pair of the electrodes in the light emission portion with a predetermined gap between the first reflection member and the light emission portion, the first reflection member reflecting the light emitted by the light emission portion toward the other electrode side.

4. The light source device according to claim 1, further comprising:
    a second reflection member attached to a sealing portion extending from at least one end of the light emission portion, the second reflection member has a substantially concavely curved reflection surface for reflecting light received from the light emission portion.

5. The light source device according to claim 1, wherein the plural openings are positioned above the arc tube.

6. The light source device according to claim 1, wherein the plural openings are positioned below the arc tube.

7. The light source device according to claim 5, wherein
    the plural openings are positioned substantially symmetric with the arc tube interposed between the openings; and
    the openings allow the cooling fluids to pass in directions inclined to a plane perpendicular to the optical axis of light emitted from the light source device substantially at the same angle.

8. The light source device according to claim 1, wherein the plural openings are slit-shaped.

9. The light source device according to claim 1, further comprising:
    a duct configured to guide a cooling fluid of the cooling fluids from the outside of the light source device toward the plural openings, wherein
    the duct has a tabular member disposed in an end side of the duct, and
    the tabular member has a plurality of holes through which the cooling fluid passes.

10. The light source device according to claim 1, further comprising:
    a duct configured to guide a cooling fluid of the cooling fluids from the outside of the light source device toward the plural openings, wherein
    the duct has a passage port having a smaller cross-sectional area than an average cross-sectional area of the duct in an end side of the duct as a port through which the cooling fluid passes.

11. A projector comprising:
    the light source device according to claim 1;
    a light modulation device configured to modulate light emitted from the light source device; and a projection device configured to project the modulated light.

12. The projector according to claim 11, wherein
the plural openings allow the cooling fluids to pass substantially at the same flow speed.

13. The projector according to claim 11, wherein
the first reflection member covers an area of one side of the pair of the electrodes in the light emission portion with a predetermined gap between the first reflection member and the light emission portion, the first reflection member reflecting the light emitted by the light emission portion toward the other electrode side.

14. The projector according to claim 11, further comprising:
a second reflection member attached to a sealing portion extending from at least one end of the light emission portion, the second reflection member has a substantially concavely curved reflection surface for reflecting light received from the light emission portion.

15. The projector according to claim 11, wherein
the plural openings are positioned above the arc tube.

16. The projector according to claim 11, wherein
the plural openings are positioned below the arc tube.

17. The projector according to claim 15, wherein
the plural openings are positioned substantially symmetric with the arc tube interposed between the openings; and
the openings allow the cooling fluids to pass in directions inclined to a plane perpendicular to the optical axis of light emitted from the light source device substantially at the same angle.

18. The projector according to claim 11, wherein the plural openings are slit-shaped.

19. The projector according to claim 11, further comprising:
a duct configured to guide a cooling fluid of the cooling fluids from the outside of the light source device toward the plural openings, wherein
the duct has a tabular member disposed in an end side of the duct, and
the tabular member has a plurality of holes through which the cooling fluid passes.

20. The projector according to claim 11, further comprising:
a duct configured to guide a cooling fluid of the cooling fluids from the outside of the light source device toward the plural openings, wherein
the duct has a passage port having a smaller cross-sectional area than an average cross-sectional area of the duct in an end side of the duct as a port through which the cooling fluid passes.

21. The light source device according to claim 1, wherein a collision jet flow generated at the collision position above the light emission portion contains both turbulent flow and turning flow.

* * * * *